US009513957B2

(12) United States Patent
Ozaki et al.

(10) Patent No.: US 9,513,957 B2
(45) Date of Patent: Dec. 6, 2016

(54) MANAGEMENT SYSTEM, MANAGEMENT PROGRAM, AND MANAGEMENT METHOD

(71) Applicant: HITACHI, LTD., Tokyo (JP)

(72) Inventors: Nobuaki Ozaki, Tokyo (JP); Daisuke Iizuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/763,551

(22) PCT Filed: May 21, 2013

(86) PCT No.: PCT/JP2013/064016
§ 371 (c)(1),
(2) Date: Jul. 27, 2015

(87) PCT Pub. No.: WO2014/188502
PCT Pub. Date: Nov. 27, 2014

(65) Prior Publication Data
US 2015/0355935 A1    Dec. 10, 2015

(51) Int. Cl.
*G06F 9/46* (2006.01)
*G06F 17/30* (2006.01)
*G06F 11/07* (2006.01)
*G06F 11/30* (2006.01)

(52) U.S. Cl.
CPC .............. *G06F 9/46* (2013.01); *G06F 11/07* (2013.01); *G06F 11/0709* (2013.01); *G06F 11/079* (2013.01); *G06F 11/30* (2013.01); *G06F 17/30309* (2013.01)

(58) Field of Classification Search
None
See application file for complete search history.

(56) References Cited

U.S. PATENT DOCUMENTS

| 7,039,012 | B2 * | 5/2006 | Nakano | G06F 9/4881 370/230 |
| 7,933,897 | B2 * | 4/2011 | Jones | G06F 17/30241 707/723 |
| 9,223,813 | B2 * | 12/2015 | Crossley | G06F 17/30309 |
| 9,268,805 | B2 * | 2/2016 | Crossley | G06F 8/36 |
| 2005/0182744 | A1 * | 8/2005 | Kawabata | G06F 8/36 |
| 2006/0085664 | A1 | 4/2006 | Nakamura et al. | |
| 2006/0101401 | A1 * | 5/2006 | Brumme | G06F 11/1482 717/124 |
| 2007/0005861 | A1 * | 1/2007 | Smith | G06F 11/2043 710/264 |
| 2008/0155544 | A1 * | 6/2008 | Soussiel | G06F 11/0715 718/100 |
| 2008/0244476 | A1 * | 10/2008 | Fotakis | G06F 17/5022 716/132 |
| 2010/0083029 | A1 * | 4/2010 | Erickson | G06F 11/0709 714/2 |

(Continued)

FOREIGN PATENT DOCUMENTS

JP   2005-234814 A   9/2005
JP   2006-099308 A   4/2006

(Continued)

*Primary Examiner* — Emerson Puente
*Assistant Examiner* — Mehran Kamran
(74) *Attorney, Agent, or Firm* — Volpe and Koenig, P.C.

(57) ABSTRACT

A plurality of process content is retained, said process content including identifiers of a plurality of part content included in each process and information which denotes dependencies among the plurality of part content. When information is inputted which designates a first process and the part content of a problem portion which is included in the first process, a process similar to the first process is retrieved. On the basis of whether there is a change in any of the plurality of part content which is included in the retrieved process, an evaluation value of the retrieved process is either incremented or decremented, and the information relating to the plurality of processes is outputted on the basis of the evaluation value.

12 Claims, 20 Drawing Sheets

(56) References Cited

U.S. PATENT DOCUMENTS

| | | | | |
|---|---|---|---|---|
| 2012/0127527 | A1* | 5/2012 | Nakabayashi | G06F 3/1204 358/1.15 |
| 2012/0185859 | A1* | 7/2012 | Kashiwaya | G06F 9/30076 718/100 |
| 2013/0111479 | A1* | 5/2013 | Chen | G06F 11/3433 718/100 |
| 2013/0111484 | A1* | 5/2013 | Chen | G06F 11/0757 718/102 |
| 2013/0263136 | A1* | 10/2013 | Ohyama | G06F 9/5027 718/100 |
| 2013/0294229 | A1* | 11/2013 | Togo | H04J 3/14 370/228 |
| 2013/0325375 | A1* | 12/2013 | Inobe | G01R 31/088 702/59 |
| 2014/0137121 | A1* | 5/2014 | Asakura | G06F 9/4881 718/102 |
| 2015/0254102 | A1* | 9/2015 | Ueda | G06F 9/4843 718/102 |
| 2015/0347177 | A1* | 12/2015 | Magee | G06F 9/4818 718/103 |
| 2015/0355935 | A1* | 12/2015 | Ozaki | G06F 11/0709 718/100 |
| 2016/0188373 | A1* | 6/2016 | Tameshige | G06F 9/50 718/103 |

FOREIGN PATENT DOCUMENTS

| | | |
|---|---|---|
| JP | 2007128450 A | 5/2007 |
| JP | 2007317089 A | 12/2007 |
| WO | 2009069474 A1 | 6/2009 |

* cited by examiner

PROCESS INFORMATION

| PROCESS IDENTIFIER | PROCESS CONSTITUENT | | | | |
| --- | --- | --- | --- | --- | --- |
| | ID | NAME | INPUT | OUTPUT | OPERATION TARGET MANAGEMENT OBJECT |
| PROCESS X v1.0.0 | 0 | PART A | X_in0 | A_out0, A_out1 | X_in1 |
| | 1 | PART B | A_out0 | B_out0 | X_in1 |
| | 2 | PART C | A_out1, B_out0 | C_out0 | X_in1 |
| PROCESS X v1.1.0 | 0 | PART A' | X_in0 | A'_out0, A'_out1 | X_in1 |
| | 1 | PART B | A'_out0 | B_out0 | X_in1 |
| | 2 | PART C | A'_out1, B_out0 | C_out0 | X_in1 |
| ... | ... | ... | ... | ... | ... |
| PROCESS Y v1.0.0 | 0 | PART D | X_in0 | D_out0 | X_in1 |
| | 1 | PART B | D_out0 | B_out0 | X_in2 |
| | 2 | PART C | X_in0, B_out0 | C_out0 | X_in1 |
| ... | ... | ... | ... | ... | ... |

FIG. 3

SYSTEM CONFIGURATION INFORMATION

| APPARATUS NAME | COMPONENT | START OF USE | END OF USE |
|---|---|---|---|
| Host_A0 | WindowsServer2008 | 2009/09/29 | 2012/010/30 |
| | WindowsServer2012 | 2012/10/30 | IN USE |
| | ApacheV2.0 | 2009/09/29 | 2012/6/19 |
| | ApacheV2.0 SECURITY PATCH #1 | 2010/4/23 | 2012/6/19 |
| | ApacheV2.0 SECURITY PATCH #2 | 2011/3/23 | 2012/6/19 |
| | ApacheV2.4 | 2012/6/19 | IN USE |
| | ... | ... | ... |
| Host_B0 | WindowsServer2010 | ... | ... |
| | Oracle | ... | ... |
| Host_B1 | OpenSUSE | ... | ... |
| ... | ... | ... | ... |
| ... | ... | ... | ... |
| ... | ... | ... | ... |

FIG. 4

USE HISTORY

| HISTORY ID | PROCESS IDENTIFIER | OPERATION TARGET APPARATUS | START OF USE | END OF USE | HISTORY ID OF SUCCEEDING PROCESS |
|---|---|---|---|---|---|
| 001 | PROCESS X v1.0.0 | Host_A0 | 2012/08/13 | 2012/09/29 | 004 |
| 002 | PROCESS X v1.0.0 | Host_B0 | 2012/10/01 | IN USE | |
| 003 | PROCESS X v1.0.0 | Host_C0, Host_C1 | 2012/11/01 | IN USE | |
| 004 | PROCESS X v1.1.0 | Host_A0, Host_A1 | 2012/09/29 | 2012/09/30 | 005 |
| 005 | PROCESS X v1.2.0 | Host_A0, Host_A1... | 2012/09/30 | 2012/11/30 | 007 |
| 006 | PROCESS X v1.3.0 | Host_B1 | 2012/12/14 | IN USE | |
| 007 | PROCESS X v1.4.0 | Host_A0, Host_A1 | 2012/11/30 | IN USE | |
| 008 | PROCESS Y v1.0.0 | Host_A2 | 2012/10/08 | 2012/12/12 | 110 |
| | ... | ... | ... | ... | |
| | ... | ... | ... | ... | |

FIG. 5

EXECUTION PERFORMANCE

| PROCESS IDENTIFIER | OPERATION TARGET APPARATUS | EXECUTION DATE/TIME | EXECUTION SUCCESS/ FAILURE | FAILED LOCATION | FAILURE CAUSE |
|---|---|---|---|---|---|
| PROCESS X v1.0.0 | Host_B0, Host_B1 | 2010/10/10 23:53:50 | SUCCESS | | |
| | | 2010/10/11 23:53:52 | FAILURE | PART A | SYSTEM CONFIGURATION CHANGE |
| | | ... | ... | | |
| | Host_B2 | 2012/ 1/29 11:30:02 | SUCCESS | | |
| | ... | ... | ... | | |
| PROCESS X v1.1.0 | | 2011/12/29 15:31:01 | SUCCESS | | |
| | | ... | FAILURE | PART B | ILLEGAL INPUT VALUE |
| | | ... | ... | | |
| ... | ... | ... | FAILURE | PART C | DEFECT OF PART C |
| PROCESS Y v1.0.0 | ... | ... | ... | | |
| ... | ... | ... | FAILURE | PART D | DEFECT OF OPERATION TARGET APPARATUS |
| ... | ... | ... | FAILURE | PART A | TIMEOUT OF PART A |

*FIG. 6*

801 — OUTPUT SCREEN EXAMPLE 1

PROCESS SUGGESTION SCREEN

802A  804  805  806  807

| PROCESS IDENTIFIER | COMPREHENSIVE EVALUATION | EVALUATION REASON | DETAILED EVALUATION REASON |
|---|---|---|---|
| PROCESS X 1.1.0 | ◎ (98 POINTS) | EVALUATION VALUE BASED ON USE HISTORY IS HIGH | BECAUSE PROCESS X1.1.0 IS USED AFTER PROCESS X1.0.0 BY (FOUR) HOSTS OF Host_A0, Host_A1, Host_A2, and Host_B0. |
| PROCESS X 1.3.0 | ○ (76 POINTS) | EVALUATION VALUE BASED ON SUITABILITY CALCULATION IS HIGH | PROBLEM PORTION HAS BEEN CHANGED. DIFFERENT DEFECT DUE TO CHANGE IN ANOTHER PORTION IS HARDLY CAUSED. |
| PROCESS X 1.0.0 (MODIFY PROCESS X) | △ (50 POINTS) | | |
| PROCESS Y 1.2.0 | × (31 POINTS) | EVALUATION VALUE BASED ON EXECUTION PERFORMANCE IS HIGH | BECAUSE EXECUTION SUCCESS PROBABILITY AT Host_B1 IS 100%. |
| ... | ... | | |

OUTPUT SCREEN EXAMPLE 2

PROCESS SUGGESTION SCREEN

| PROCESS IDENTIFIER | COMPRE-HENSIVE EVALUATION | EVALUATION ITEM | EVALUA-TION VALUE | DETAILED EVALUATION REASON |
|---|---|---|---|---|
| PROCESS X 1.1.0 | S | SUITABILITY EVALUATION VALUE | ★★★ | PART A OF PROBLEM PORTION HAS BEEN CHANGED TO PART A'. |
| | | USE HISTORY EVALUATION VALUE | ★★★ | PROCESS X1.1.0 IS USED FOR SUCCEEDING PROCESS OF PROBLEM PROCESS BY SIX HOSTS. |
| | | EXECUTION PERFORMANCE EVALUATION VALUE | ★★☆ | TOTAL SUCCESS PROBABILITY IS HIGH. RECENT EXECUTION FAILURE RATE IS HIGH. |
| | | COMMON DEFECT HANDLING EVALUATION VALUE | ★★☆ | COMMON DEFECT HAS BEEN HANDLED BY SIX HOSTS. |
| PROCESS X 1.3.0 | A | SUITABILITY EVALUATION VALUE | ★★★ | PART A OF PROBLEM PORTION HAS BEEN CHANGED TO A". |
| | | USE HISTORY EVALUATION VALUE | ★★☆ | PROCESS X1.3.0 IS USED FOR SUCCEEDING PROCESS OF PROBLEM PROCESS BY FOUR HOSTS. |
| | | EXECUTION PERFORMANCE EVALUATION VALUE | ★☆☆ | TOTAL EXECUTION COUNT IS SMALL. |
| | | COMMON DEFECT HANDLING EVALUATION VALUE | ★★☆ | COMMON DEFECT HAS BEEN HANDLED BY FOUR HOSTS. |
| ... | ... | ... | ... | ... |

OK

*FIG. 8B*

MANAGEMENT SYSTEM, MANAGEMENT PROGRAM, AND MANAGEMENT METHOD

BACKGROUND OF THE INVENTION

A technology disclosed herein relates to an operation management technology for a computer system.

As the background art of this technical field, there are disclosed JP 2007-128450 A and JP 2007-317089 A.

JP 2007-128450 A includes the description "Provided is a reused software part management system configured to allow one to know a version of a software part compatible with a software part used before with ease and allow one to confirm whether or not a software part to be registered is compatible with a software part of an older version with ease. The reused software part management system includes: part registration means for registering a part specification and a source code of a software part in a repository in association with the software part; part retrieval means for retrieving the software part in response to a request; and part extraction means for extracting the retrieved software part, the part specification of the software part, and the source code." (See Abstract).

JP 2007-317089 A includes the description "Provided is a software automatic update system capable of automatically selecting an optimal version without being limited to the previous version when software of a plurality of versions exists. The software automatic update system includes an activation/stop management application configured to manage activation/stop of a function-specific application to be executed by a computer apparatus to manage manufacturing and examination of a product and update of software, and the activation/stop management application includes a version selection module configured to select a specific version from a plurality of versions held for the function-specific application." (See Abstract).

SUMMARY OF THE INVENTION

To manage a computer system including a server, a storage, and a network, for example, a management system carries out operation management jobs including system configuration changes such as activation of hardware or software, installation of software, and setup with a set parameter. Automation of those operation management jobs is becoming widespread. Each of those operation management procedures (hereinafter referred to as "process content") automatically executed by the management system is formed of at least one operation management operating part (hereinafter referred to as "part content") such as exemplified by the activation of software. Those process contents or part contents are also subjected to continuous version upgrade, and when there is an imperfection in a process content, it is necessary to modify a problem portion of the process content.

The process content is used by a plurality of kinds of management systems. Therefore, when a use period is sufficiently long, a plurality of process contents that have handled a fault that occurred in a plurality of kinds of management systems are derived from one process content, and those derivative process contents are accumulated. In such a case, when a problem occurs in any one of the process contents and when a derivative process content obtained by modifying the problem portion of the process content exists, there is a demand to shorten a time period necessary to solve the problem by reusing the derivative process content.

In JP 2007-128450 A, there is disclosed means for allowing one to know the version of the software part compatible with the software part used before with ease. Specifically, the server disclosed in JP 2007-128450 A manages a version upgrade target software part, a specification, and a source in association with one another, and in order to search for the compatible software part, tests a part to be a candidate therefor and determines whether or not the part satisfies the specification corresponding to the version upgrade target software part. However, unlike the software part, in regard to the process content, it is not possible to determine adequacy of an operation of the process content with a single part content. Thus, with the technology for conducting a test with a single software part, which is disclosed in JP 2007-128450 A, it is not possible to suggest an adequate derivative process content that acts on a management target.

On the other hand, in JP 2007-317089 A, there is disclosed a technology in which, when the software executed by the computer apparatus is updated, software of a version selected from a plurality of versions provided to the software based on a condition set in advance is updated as an execution file, and the computer apparatus is controlled to execute the execution file. However, in general, the process content is formed of part contents of a plurality of kinds, and hence it is conceivable that an execution failure of the process content is ascribable to at least one of the part contents of a plurality of kinds. This means that at least the same number of adequate process contents to substitute the process content that has failed to execute can exist as the number of constituents of the process content that has failed to execute. Therefore, with the technology for suggesting a specific process content for a predetermined process content, which is disclosed in JP 2007-317089 A, it is not possible to suggest an adequate derivative process content for solving a problem that has occurred in an arbitrary portion.

To solve the foregoing problem, there is provided a management system configured to manage a plurality of management target systems, the management system comprising: a processor for executing a management program; and a storage resource to be coupled to the processor, the storage resource storing a plurality of process contents for executing operation management of the plurality of management target systems, the plurality of process contents comprising: identifiers of a plurality of part contents included in each of the plurality of process contents; and information indicating a dependence relationship between the plurality of part contents, wherein the processor is configured to: retrieve, when information for specifying a first process content that has been executed among the plurality of process contents and information for specifying one of the plurality of part contents that has failed to execute as a problem portion among the plurality of part contents included in the first process content are input, one of the plurality of process contents similar to the first process content from the plurality of process contents stored in the storage resource; increase an evaluation value of the retrieved one of the plurality of process contents when one of the plurality of part contents corresponding to the problem portion among the plurality of part contents included in the retrieved one of the plurality of process contents is different from the one of the plurality of part contents specified as the problem portion; increase the evaluation value of the retrieved one of the plurality of process contents when one of the plurality of part contents corresponding to a data source portion of the problem portion, which is identified based on the dependence relationship between the plurality of part contents among the plurality of part contents included in the retrieved one of the plurality of process contents, is different from one of the plurality of part contents of the data source portion of the problem portion of the first process content; decrease the evaluation value of the retrieved one of the plurality of process contents when one of the plurality of part contents corresponding to a first portion other than any one of the problem portion and the data source portion of the problem portion among the plurality of part contents included in the retrieved one of the plurality of process contents is different from one of the plurality of part contents of the first portion of the first process content; and output information relating to the plurality of process contents based on the evaluation value calculated for each of the plurality of process contents.

According to the one embodiment of this invention, it is possible to suggest a process with which a problem is highly likely to have been solved in a short time without requiring a user's time and labor. Objects, configurations, and effects other than those described above become apparent from the following descriptions of embodiments of this invention.

BRIEF DESCRIPTION OF THE DRAWINGS

FIG. 3 is an example of an explanatory diagram of a process information according to the first embodiment of this invention.

FIG. 4 is an example of an explanatory diagram of a system configuration information according to the first embodiment of this invention.

FIG. 5 is an example of an explanatory diagram of a use history according to the first embodiment of this invention.

FIG. 6 is an example of an explanatory diagram of an execution performance according to the first embodiment of this invention.

FIG. 8A and FIG. 8B are examples of a screen through which a processing result of the determination flow conducted by the management server is to be output according to the first embodiment of this invention.

DETAILED DESCRIPTION OF THE PREFERRED EMBODIMENTS

Figure 1:
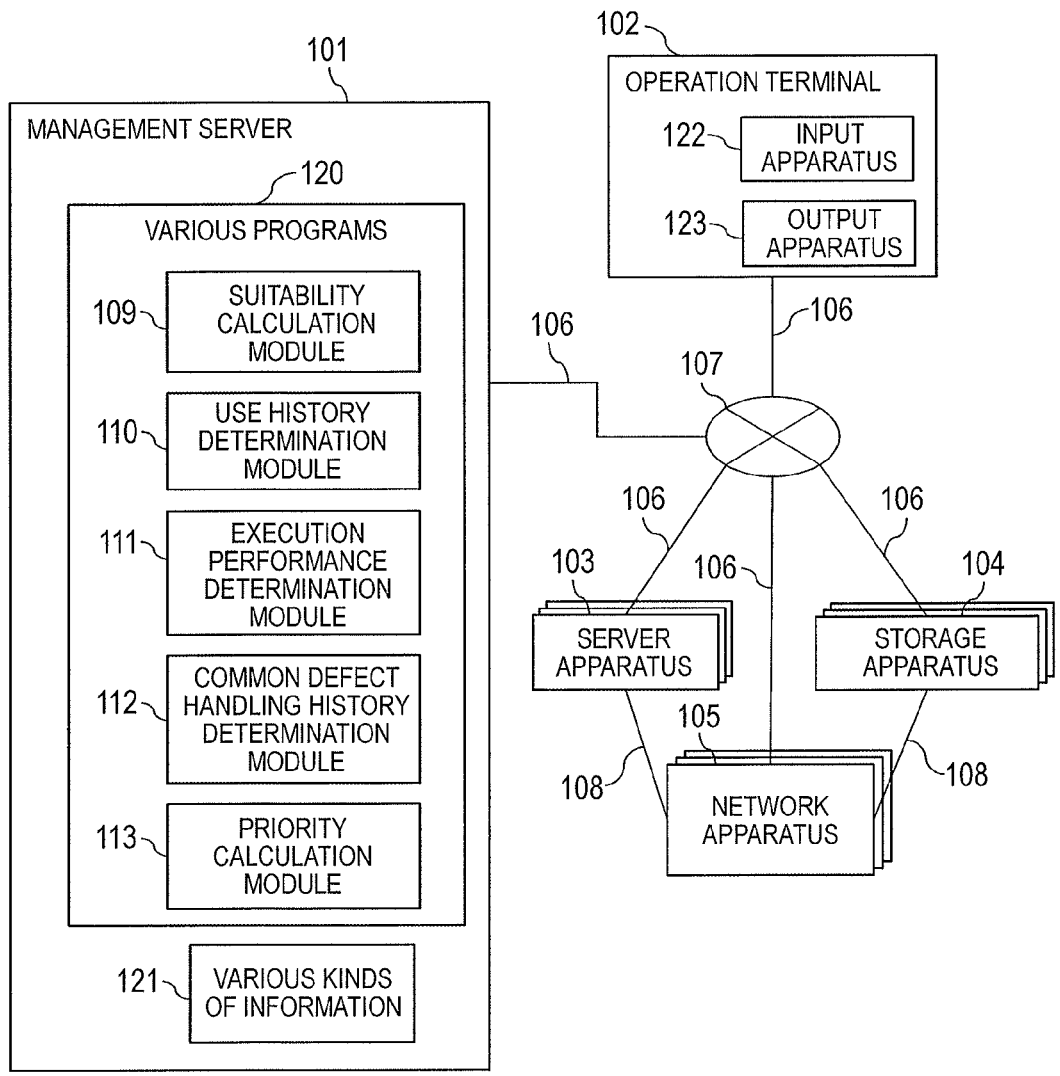
FIG. 1 is an example of a block diagram for illustrating a system configuration according to a first embodiment of this invention.

Embodiments of this invention below refer to the accompanying drawings, which constitute a part of the disclosure, but the drawings are illustrations of exemplary embodiments that can embody this invention, and do not limit the scope of this invention. In those drawings, like numerals denote like components throughout a plurality of drawings. Further, the detailed description provides various exemplary embodiments, but, as described and illustrated in the following, this invention is not limited to the embodiments described and illustrated herein, and it should be noted that this invention can be extended to other embodiments that are or will be publicly known to a person skilled in the art.

According to an exemplary embodiment of this invention, a management computer is a computer for managing a plurality of management target apparatus. Examples of a type of management target apparatus include a computer such as a server, a network apparatus such as an IP switch, a router, a fibre channel (FC) switch, a NAS, and a storage apparatus. It should be noted that a logical or physical configuration such as a device included in the management target apparatus is referred to as "component". Examples of the component include a port, a processor, a storage resource, a storage device, a program, a virtual machine, a logical volume defined inside the storage apparatus, a RAID group, system software, middleware, and application software. It should be noted that the management target apparatus and the component are each referred to as "management object" when handled without any particular distinction. Further, a single or a plurality of apparatus to be operated by execution of a predetermined process content is referred to collectively as "operation target apparatus".

Moreover, many specific detailed items are disclosed for a complete understanding of this invention in the detailed description below. However, all of those specific detailed items are not necessary to embody this invention, which is apparent to a person skilled in the art. In other situations, publicly known structures, materials, circuits, processing, and interfaces are not described in detail, and/or are illustrated in a form of block diagram in order to avoid making this invention meaninglessly difficult.

Further, portions described in detail in the following are described as algorithmic descriptions or symbolic expressions of the operation inside the computer. Those algorithmic descriptions and symbolic expressions are means used by a person skilled in a data processing technology to communicate gist of his/her invention to another person skilled in the art most effectively. The algorithm is a series of defined steps to reach a desired final state or result. In this invention, steps to be executed require to physically operate a tangible quantity to realize a tangible result.

It should be noted that each of those quantities takes a form of an electrical or magnetic signal to which operations such as storage, transfer, coupling, and comparison can be applied, which are not usually indispensable. It is known that those signals are sometimes conveniently referred to as bit, value, element, symbol, character, item, number, instruction, and the like for common use in principle. However, it should be noted that all of the items and similar items should be related to appropriate physical quantities, and are simply convenient labels attached to those physical quantities.

Unless otherwise specified, as apparent from the following description, throughout the description herein, a description using terms such as "processing", "calculating", "computing", "determining", and "displaying" may include operations and processing of other information processing apparatus for operating data represented as a physical (electronic) quantity in a computer system or a register and a memory of the computer system, thereby converting data into other data similarly represented as a physical quantity in the memory or the register of the computer system, other information storage, transmission, or display apparatus.

Moreover, this invention relates to an apparatus for carrying out operations described herein. The apparatus may be built specifically for required purposes, or may include at least one general-purpose computer selectively activated or reset by at least one computer program. Such a computer program can be stored in, but not limited to, a computer-readable memory medium such as an optical disc, a magnetic disk, a read-only memory, a random access memory, a solid state device, and a drive, or an arbitrary other medium suitable for storage of electronic information.

In the following description, although a description is given by using "program" (including program modules and the like forming the program) as a subject in some cases, the program is executed by a processor to perform defined processing while using a memory and a communication port (communication control device). Therefore, "program" described as a subject in a description of processing may be replaced by "processor". Further, processing disclosed while a program is used as a subject may also be interpreted as processing to be executed by a computer such as a management server or an information processing apparatus. Further, a part or all of processing to be executed by a processor in accordance with a program may also be implemented by dedicated hardware.

Further, various programs may also be installed onto each computer by a program distribution server or a computer-readable memory medium.

A set of at least one computer for managing an information processing system and displaying information for display of the invention of this application is sometimes referred to as "management system". In a case where a management computer displays the information for display, the management computer is the management system. Further, a combination of the management computer and a computer for display is also the management system. Further, processing equivalent to that of the management computer may also be implemented by a plurality of computers in order to speed up management processing and achieve a higher reliability, and in this case, the plurality of computers (including the computer for display in a case where the computer for display performs display) are the management system.

It should be noted that the management server includes an input/output device. As examples of the input/output device, a display, a keyboard, and a pointer device are conceivable, but any device other than those may be used. Further, the input/output device can be substituted by a serial interface or an Ethernet interface. Specifically, a computer for display including the display, the keyboard, or the pointer device may be connected to the interface, and may substitute input and display through the input/output device by the management server transmitting information for display to the computer for display to allow the computer for display to conduct display based on the information for display or by the management server receiving the information for input transmitted from the computer for display.

Algorithms and displays described herein do not essentially relate to any specific computer or other apparatus. Various general-purpose systems may be used along with programs and modules disclosed herein, but it is sometimes more convenient to build a more specific apparatus for executing steps of a desired method. Structures of the various systems become apparent from a description disclosed later. Moreover, this invention is not described while a specific program language is considered as a prerequisite herein. As described later, it is understood that various programming languages may be used in order to carry out the disclosure of this invention. An instruction in a program language can be executed by at least one processing apparatus such as a central processing unit (CPU), a processor, or a controller.

In the following description, although pieces of information of this invention are described by using such expressions as "aaa table", "aaa list", "aaa DB", and "aaa queue" in some cases, those pieces of information may be expressed by data structures other than a table, a list, a DB, a queue, and the like. Therefore, "aaa table", "aaa list", "aaa DB", "aaa queue", and the like are sometimes referred to as "aaa information" in order to show that those pieces of information are independent of their data structures.

In addition, although such expressions as "identification information", "identifier", "name", "ID" are used in some cases in order to describe details of each piece of information, those expressions are interchangeable.

<Outline of Embodiment of this Invention>

As described below in detail, an exemplary embodiment of this invention provides calculation of an alternative process to a process that has failed to execute on the management target apparatus, which produces an effect of reducing a fault handling time for an operation management job, and also provides an apparatus, a method, and a computer program for calculating the alternative process. The wording "alternative process to the process that has failed to execute" used herein represents a process that can achieve the same object as that of the process that has failed to execute and that does not include the cause of the failure.

To manage a computer system including a server, a storage, and a network, a management system of the computer system carries out operation management jobs including system configuration changes such as activation of hardware or software, installation of software, and setup with a set parameter. The management system according to this embodiment automatically executes those operation management jobs.

The management system automatically executes those operation management jobs based on execution registration details set in advance. Each of the operation management jobs (hereinafter referred to as "process content") automatically executed by the management system is formed of at least one operation management job (hereinafter referred to as "part content") such as exemplified by the activation of hardware and command execution. Those process contents and part contents are also subjected to continuous version upgrade, and are managed as derivative process contents or derivative part contents.

The derivative part content represents a part content compatible with a certain part content in terms of input/output. For example, when processing executed by two part contents is the same while operating systems (OS) that can execute the two part contents are of different kinds, those part contents are the derivative part contents. As another example, the part contents or the like corresponding to software provided with version names such as Windows ME or Windows Vista or version numbers such as v1.0 or v2.0 are the derivative part contents.

Further, for example, the part content updated for the purpose of a change of a kind or a number of pieces of data that can be received as an input, a change of a format of data that can be output, a data count, or a data amount, an improvement in vulnerability of the part content, or the like can also be managed as the derivative part content.

The derivative process content represents a process content in which at least one of part contents forming a certain process content (hereinafter referred to also as "original process content" for the sake of convenience of description) has been replaced by a derivative part content, a process content to which at least one of arbitrary part contents has been added within a range that maintains compatibility with the original process content in terms of the input/output, or a process content from which at least one of the part contents forming the original process content has been deleted within the range that maintains compatibility with the original process content in terms of the input/output.

However, the above-mentioned derivative process contents are merely typical examples. In the embodiment of this invention, any process content that satisfies a predetermined condition for a similarity as described later instead of satisfying the above-mentioned conditions can be handled as a derivative process content.

It should be noted that the process content includes mapping information on an execution order, a branch in execution, and repetition of the part contents and the input/output of each part. An operation administrator saves power for operation management by using the process content to automate the operation management jobs.

When executing the process content, the management system can acquire component configuration information including logical or physical configuration information such as a device included in a computer system operated by the process content, and can acquire and hold information on a process instance generated from the process content, the information including an order of the executed part contents, a branch route, a value of the input/output of each part content, an execution time of each part content, and an execution success/failure of each part content.

As the execution registration of the process content, there can be registration to be executed only once at an arbitrary date/time, registration to be executed repeatedly at arbitrary times, or registration to be executed with an occurrence of an incident or an event such as an execution result of a specific process content as an activation condition. In addition, an effective execution registration period may be specified.

Further, the management system may manage a single or a plurality of computer systems, to allow a plurality of management administrators to use the same process content or to provide a predetermined process content only to a specific operation administrator.

In the following description, the process content is described by being referred to merely as "process". For the sake of convenience, an execution instance generated from the process content may be expressed as "process" as well.

<First Embodiment>

Now, a first embodiment of this invention is described with reference to the accompanying drawings.

FIG. 1 is an example of a block diagram for illustrating a system configuration according to the first embodiment of this invention.

An information processing system according to this embodiment includes a management server 101, an operation terminal 102, a server apparatus 103, a storage apparatus 104, and a network apparatus 105.

The management server 101, the operation terminal 102, the server apparatus 103, the storage apparatus 104, and the network apparatus 105 are connected to a management network 107 through links 106. The server apparatus 103 and the storage apparatus 104 are connected to the network apparatus 105 through links 108. The links 106 and 108 are realized by a wired or wireless connection method, and may include at least one subnetwork or at least one virtual private network (VPN). The management server 101, the operation terminal 102, the server apparatus 103, the storage apparatus 104, and the network apparatus 105 may be connected to the management network 107 and the network apparatus 105 by different methods from one another.

The server apparatus 103 and the storage apparatus 104 may be directly connected to each other by a wired or wireless connection method without intermediation of the network apparatus 105.

A plurality of server apparatus 103 are illustrated in FIG. 1 as an example, but the information processing system according to this embodiment may not include the server apparatus 103, or may include only one server apparatus 103. The same applies to the storage apparatus 104 and the network apparatus 105. Further, one management server 101 is illustrated in FIG. 1 as an example, but the information processing system according to this embodiment may include a plurality of management servers 101. The same applies to the operation terminal 102. The management server 101, the operation terminal 102, the server apparatus 103, the storage apparatus 104, and the network apparatus 105 may be realized by virtual machines. Further, at least any two of the management server 101, the operation terminal 102, the server apparatus 103, the storage apparatus 104, and the network apparatus 105 may be realized by the same casing or the same virtual machine.

The network apparatus 105 may be connected to another network apparatus 105 by a wired or wireless connection method. Further, a network provided by the network apparatus 105 may be the same as the management network 107. Further, the link 106 and the link 108 may be the same, or the wireless connection method and the wired connection method may coexist in the links 106 or the links 108.

The management server 101 includes various programs 120 and various kinds of information 121. The management server 101 may include a processing module (not shown), a program (not shown), and an apparatus (not shown) other than those, or may not include a part thereof.

The various programs 120 include a suitability calculation program 109, a use history determination program 110, an execution performance determination program 111, a common defect handling history determination program 112, and a priority calculation program 113, but may further include a program (not shown) other than those, or may not include a part thereof.

The management server 101, and the various programs 120 and the various kinds of information 121 held by the management server 101 are described in detail with reference to FIG. 2. It should be noted that, as described with reference to FIG. 2, functional blocks realized by the processor executing the above-mentioned programs are the suitability calculation module 109, the use history determination module 110, the execution performance determination module 111, the common defect handling history determination module 112, and the priority calculation module 113. In the following description and the accompanying drawings, for the sake of convenience, each of the above-mentioned programs itself may be represented by, for example, "suitability calculation module 109".

The operation terminal 102 includes an input apparatus 122 and an output apparatus 123. The input apparatus 122 and the output apparatus 123 may be the same apparatus as in, for example, a touch panel.

Figure 2:
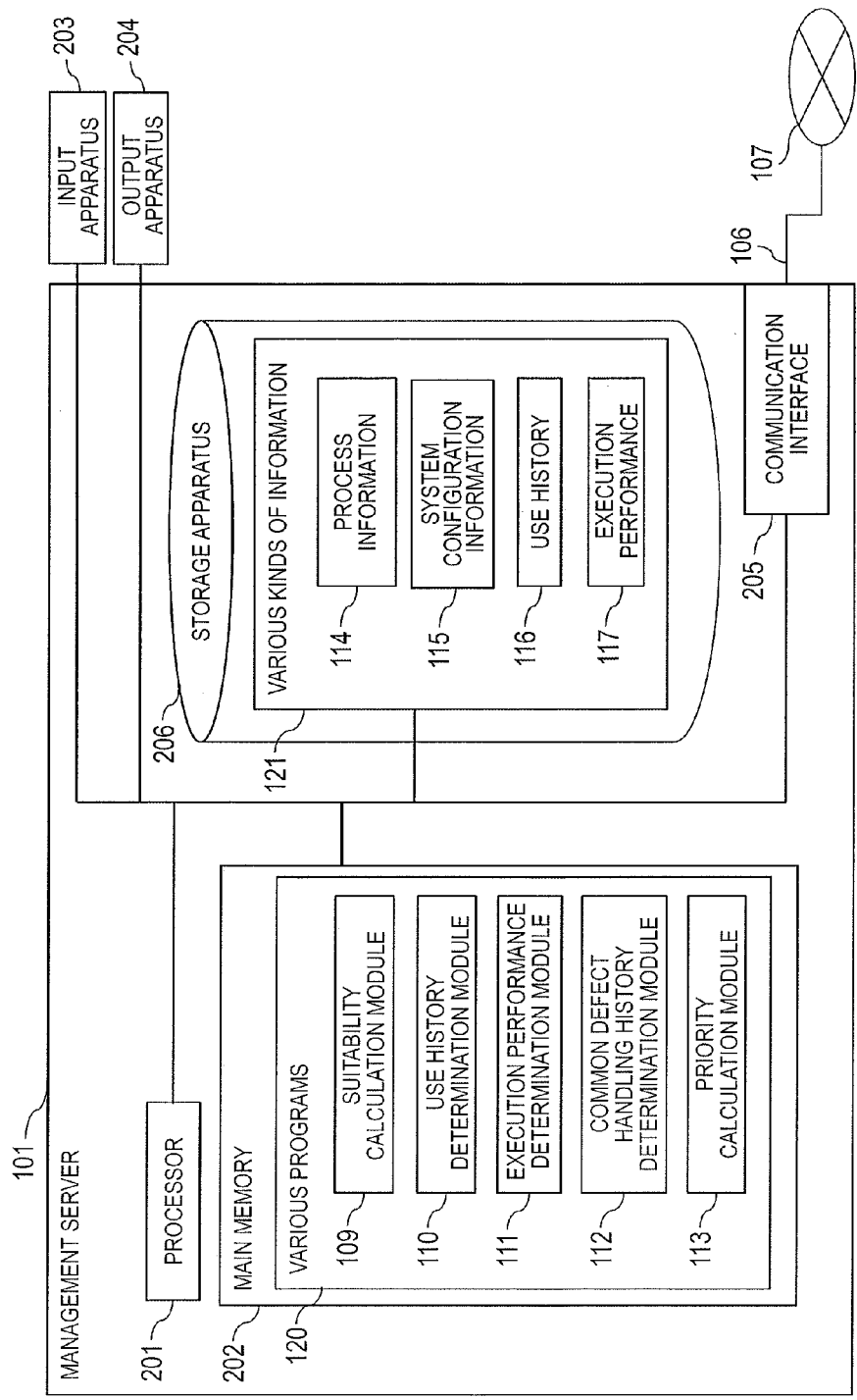
FIG. 2 is an example of a block diagram for illustrating a configuration of a management server according to the first embodiment of this invention.

FIG. 2 is an example of a block diagram for illustrating a configuration of the management server 101 according to the first embodiment of this invention.

The management server 101 includes a processor 201, a main memory 202, an input apparatus 203, an output apparatus 204, a communication interface 205, and a storage apparatus 206, which are communicably connected to one another.

The processor 201 executes the various programs 120 stored in the main memory 202, such as the suitability calculation program 109, the use history determination program 110, the execution performance determination program 111, the common defect handling history determination program 112, and the priority calculation program 113, to thereby operate processing of the suitability calculation module 109, the use history determination module 110, the execution performance determination module 111, the common defect handling history determination module 112, and the priority calculation module 113, respectively. It should be noted that, when the various programs 120 include a program other than the above-mentioned programs, the program is also stored in the main memory 202 and executed by the processor 201.

Instead of executing the various programs 120 by the processor 201, the suitability calculation module 109, the use history determination module 110, the execution performance determination module 111, the common defect handling history determination module 112, and the priority calculation module 113 may be realized by hardware by, for example, being converted into an integrated circuit as processing modules for conducting the respective pieces of processing. In the following, to simplify the description, the respective processing modules realized by the processor 201 executing the various programs 120 stored in the main memory 202 are described as main subjects of the respective pieces of processing. In other words, in the following description, the processing executed by the respective processing modules described above is actually executed by the processor 201 based on the various programs 120 stored in the main memory 202.

The suitability calculation module 109, the use history determination module 110, the execution performance determination module 111, the common defect handling history determination module 112, and the priority calculation module 113 are described in detail with reference to FIG. 9 to FIG. 13.

The storage apparatus 206 holds the various kinds of information 121 such as process information 114, system configuration information 115, a use history 116, and an execution performance 117, but may further hold information (not shown) other than those pieces of information, or may not include a part thereof. Further, only one storage apparatus 206 is illustrated in FIG. 2, but the management server 101 may include a plurality of storage apparatus, and the process information 114, the system configuration information 115, the use history 116, and the execution performance 117 may be held by different storage apparatus from one another.

The process information 114, the system configuration information 115, the use history 116, and the execution performance 117 are described in detail with reference to FIG. 3 to FIG. 6.

It should be noted that the various kinds of information 121 may be stored in a storage apparatus (not shown) connected through an external storage apparatus interface (not shown) or the communication interface 205 of the management server 101.

The storage apparatus 206 and the main memory 202 may be the same storage apparatus.

The input apparatus 203 and the output apparatus 204 may be the same apparatus, or one or both thereof may be omitted.

The communication interface 205 is connected to the management network 107 through the link 106, and communicates to/from the operation terminal 102, the server apparatus 103, the storage apparatus 104, the network apparatus 105, and the like.

FIG. 3 is an example of an explanatory diagram of the process information 114 according to the first embodiment of this invention.

The process information 114 represents information on a process executed by the management target apparatus (in the example of FIG. 1, at least one of the server apparatus 103, the storage apparatus 104, and the network apparatus 105) in accordance with an instruction from the management server 101. For example, when an administrator inputs, to the management server 101, an instruction to control one of the management target apparatus to execute one of the process contents registered in the process information 114, the management server 101 controls the specified management target apparatus to execute the part contents included in the specified process content in order. Such processing of the management server 101 can be realized by the processor 201 executing a known program (not shown) for run book automation (RBA) included in the various programs 120, and hence a description thereof is omitted.

The process information 114 has a table format, and is formed of at least one row. Each row corresponds to one process content. Every row includes two columns.

In this case, the two columns are a process identifier 301 and a process constituent 302. Each row of the process information 114 may further include a column (not shown) other than those, or may not include any one of those columns.

The process constituent 302 has a table format, and is formed of at least one row. Each row corresponds to one part content. Every row includes five columns.

In this case, the five columns are an ID 303 serving as an identifier of a process constituent, a name 304 of the process constituent, an input 305 serving as a data source of the process constituent, an output 306 of the process constituent, and an operation target management object 307 indicating a management object to be operated by each part. Each row of the process constituent 302 may further include a column (not shown) other than those, or may not include any one of those columns.

When a process is newly registered, the row corresponding to the process may be manually input by the system administrator or the like, or may be input by using some tool or utility. The row thus input is added to the process information 114.

The input 305 and the output 306 express a dependence relationship in data between the part contents forming the process content (for example, the data output from which part content is to be input to which part content). For example, the process identified by the value "Process X v1.0.0" of the process identifier 301 shown in FIG. 3 (hereinafter also referred to simply as "Process X v1.0.0"; the same applies to another process) includes three part contents identified by the values "Part A", "Part B", and "Part C" of the name 304 (hereinafter also referred to simply as "Part A", "Part B", and "Part C"; the same applies to another part content). Of those, the output 306 of Part A and the input 305 of Part B both include "A_out0". This indicates that A_out0 output from Part A is input to Part B, that is, that there is a direct dependence relationship between Part A and Part B.

The dependence relationship between the part contents are not only identified by the dependence relationship in the data input/output as described above, but also identified based on an operation target of each part content. When a value indicating the operation target of each part content is input in addition to such a value indicating the input/output of the data as described above, the process information 114 holds the value as the operation target management object 307 for each part content. The information shown in the operation target management object 307 is information for identifying the operation target of the part content, for example, a path for specifying a file, a specific software name, or a host name.

By the operation target management object 307, it is possible to identify a dependence relationship between the part contents other than the dependence relationship in the data. For example, in a case of the dependence relationship between the part contents forming Process Y v1.0.0, there is no direct dependence relationship in the data between Part D and Part C because the input 305 of Part D and the output 306 of Part C do not include a common value and the output 306 of Part D and the input 305 of Part C also do not include a common value. However, it is understood that there is a dependence relationship between Part D and Part C because the operation target management objects 307 of Part D and Part C are the same by being X_in1.

The dependence relationship between the part contents other than the dependence relationship in the data represents a case where, for example, Part D is an activation part of a virtual machine and Part C is property setting of the virtual machine activated by Part D. In this case, there is no dependence relationship in the data between Part D and Part C, but there is a dependence relationship therebetween in that Part C executes setting of software activated by Part D.

In FIG. 3, the process constituent 302 is expressed by nesting a table into another table (that is, so that the process constituent 302 further includes data having a table format), but may be held while being divided into a plurality of tables.

FIG. 4 is an example of an explanatory diagram of the system configuration information 115 according to the first embodiment of this invention.

The system configuration information 115 represents configuration information on the management target apparatus of the management server 101.

The system configuration information 115 has a table format, and is formed of at least one row. Each row corresponds to one piece of software installed on one management target apparatus or one piece of hardware forming one management target apparatus. Every row includes four columns. In this case, the four columns are an apparatus name 401 indicating a name of the management target apparatus, a component 402 indicating a name of the software installed on the management target apparatus or a name of the hardware forming the management target apparatus, a start of use 403 indicating a date/time at which the software started being used, and an end of use 404 indicating a date/time at which the software stopped being used.

Each row of the system configuration information 115 may further include a column (not shown) other than those, or may not include some of those columns.

In the component 402 of the system configuration information 115, a plurality of pieces or a single piece of software may be registered, or any piece of software may not be registered, as the software installed on the management target apparatus.

In FIG. 4, a single table holds the configuration information on a plurality of management target apparatus, but the system configuration information 115 may be held while being divided into a plurality of tables, for example, for each management target apparatus or for each piece of software installed on the management target apparatus.

When the management target apparatus is newly added, a row corresponding to the system is inserted into the system configuration information 115. Further, also when there is a configuration change of the management target apparatus, a row corresponding to a location of the change is changed or inserted. Further, the insertion or the change may be manually input by the operation administrator, or may be input by using some tool or utility.

FIG. 5 is an example of an explanatory diagram of the use history 116 according to the first embodiment of this invention.

The use history 116 represents history information on the execution registration of a process managed by the process information 114 with respect to the management target apparatus.

The use history 116 has a table format, and is formed of at least one row. Each row corresponds to one execution registration of one process. Every row includes six columns. In this case, the six columns are a history ID 501 indicating a management number of the history information, a process identifier 502 for identifying a process executed on the management target apparatus, an operation target apparatus 503 indicating the management target apparatus on which the process was executed, a start of use 504 indicating a date/time at which the process was subjected to the execution registration, an end of use 505 indicating a date/time at which the execution registration of the process was deleted, and a succeeding process ID 506 indicating a history ID of a process to be subjected to the execution registration in place of the process that has ended after the end of use of the process. The succeeding process ID 506 in the row in which the end of use 505 is "in use" may be blank.

Each row of the use history 116 may further include a column (not shown) other than those, or may not include some of those columns.

In FIG. 5, one table holds the use history 116 relating to all the management target apparatus for all the processes, but the use history 116 may be held while being divided into a plurality of tables by, for example, being held while being divided for each process identifier 502 or for each operation target apparatus 503.

FIG. 6 is an example of an explanatory diagram of the execution performance 117 according to the first embodiment of this invention.

The execution performance 117 represents performance information on the execution instance of the process managed by the process information 114 conducted on the management target apparatus.

The execution performance 117 has a table format, and is formed of at least one row. Every row includes six columns. In this case, the six columns are a process identifier 601 indicating the process executed, an operation target apparatus 602 indicating the management target apparatus on which the process was executed, an execution date/time 603 indicating a date/time at which the process instance was executed on the management target apparatus, an execution success/failure 604 indicating an execution result of the process, a failed location 605 indicating a failed portion in a case where the execution success/failure 604 of the process is a failure, and a failure cause 606 indicating a failure cause in the case where the execution success/failure 604 of the process is a failure.

Fields of the failed location 605 and the failure cause 606 in the row may be blank in the case where the execution success/failure 604 is successful.

Each row of the execution performance 117 may further include a column (not shown) other than those, or may not include some of those columns.

In FIG. 6, one table holds the execution performance 117 relating to all the execution registrations of all the processes, but the execution performance 117 may be held while being divided for each execution registration.

Each item registered in the operation target apparatus 602 indicates one execution registration of one process, and information on the columns 603, 604, 605, and 606 corresponding to each item indicates information unique to the process instance generated from one process subjected to the execution registration. To describe a part of the specific example shown in FIG. 6, Process X v1.0.0 was subjected to the execution registration with respect to the operation target apparatus Host_B0 and Host_B1 in the past or is still subjected to the execution registration at present. Process X v1.0.0 was actually executed at least at 23:53:50, Oct. 10, 2010 and at 23:53:52, Oct. 11, 2010, and the former execution was successful while the latter execution was a failure.

In the failure cause 606, information obtained by manual work may be input, or information obtained by some tool or utility (not shown) may be input. Now, a description is made of examples of some methods of estimating and suggesting the failure cause by some utility.

For example, in the case where the previous execution was successful while the current execution fails in the same execution registration regarding the same operation target apparatus as described above, the utility determines whether or not there has been a change in the configuration information on the operation target apparatus during a period from the previous execution to the current execution, and when there has been a change, the utility can suggest that the system configuration change be one of causes of the failure.

Further, when a predetermined portion of a predetermined process fails to execute due to an error in format of input data as a data source at the predetermined portion, the utility can suggest that an illegal input value be the cause of the failure.

Further, when the process has failed to execute due to the fact that the operation target apparatus is not coupled to a network or is in a state incapable of executing the process (for example, the operation target apparatus is not powered on or is not ready to receive another processing because a CPU activity ratio is already high) even when coupled to the network, the utility can suggest the defect of the operation target apparatus as the failure cause.

Further, when the process fails to execute because a processing time period on the operation target apparatus becomes longer than a time period of a timeout set for the part of the process, the utility can suggest the timeout of the part is the cause of the failure.

Lastly, when the cause of the failure does not fall into the above-mentioned causes, the utility suggests the defect of the part as the cause, to thereby be able to automatically detect all the failure causes shown in FIG. 6.

In addition, the failure cause 606 may be acquired by using such a root cause analysis method for an IT apparatus as disclosed in JP 2010-86115 A and JP 2011-518359 A.

Figure 7:
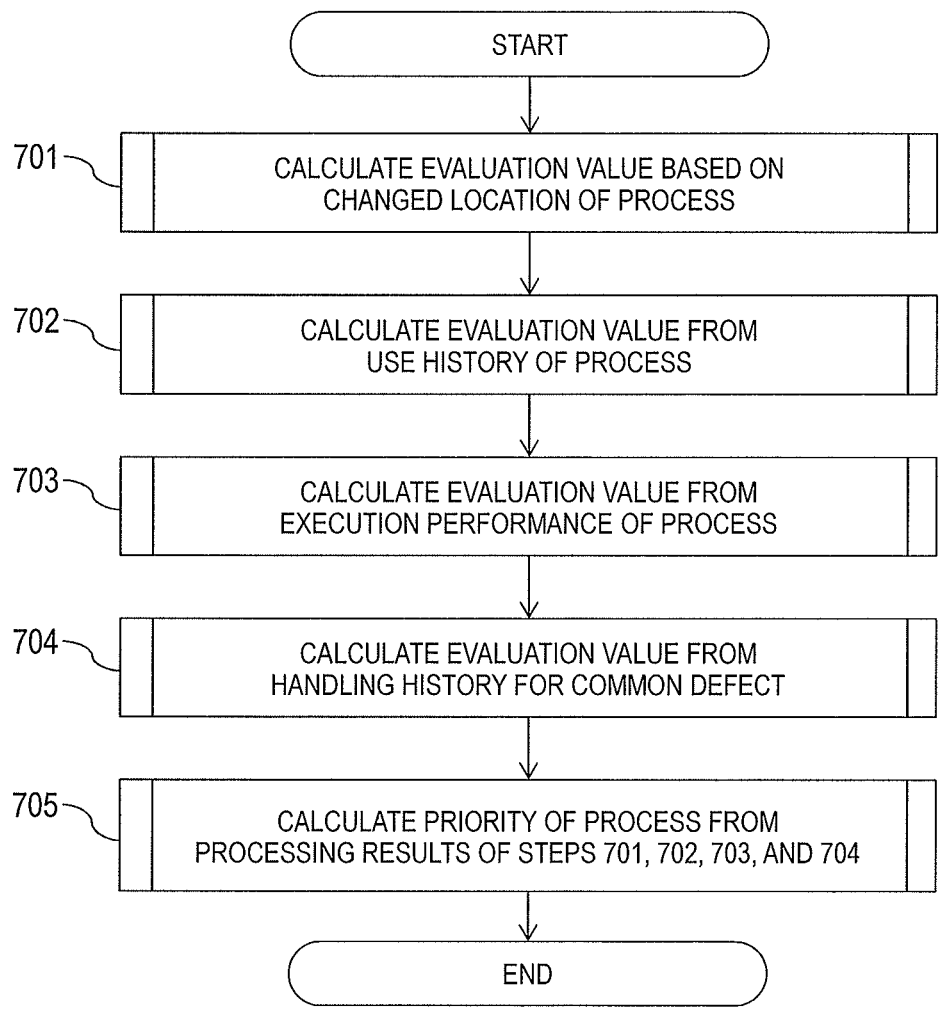
FIG. 7 is an example of a flowchart for illustrating an outline of processing executed by the management server according to the first embodiment of this invention.

FIG. 7 is an example of a flowchart for illustrating an outline of processing executed by the management server 101 according to the first embodiment of this invention.

Specifically, FIG. 7 is an illustration of an outline of the flow (hereinafter referred to as "determination flow") of processing (hereinafter referred to as "suggestion processing") for selecting processes that are relatively high in possibility that the processes can substitute a given process (hereinafter referred to as "the given process") that has failed to execute on the management target apparatus (that is, processes that can achieve an equivalent object to that of the given process and that is relatively high in possibility of not including the cause of the failure in execution) from among the original process or derivative processes of the given process included in the processes managed by the process information 114, and calculating priorities thereof.

The determination flow is activated in response to the operation administrator's instruction input through the input apparatus 122 or the input apparatus 203. Alternatively, the activation of the determination flow may be triggered by the failure in the execution of the process on the management target apparatus, by the configuration change of the management target apparatus, or by the change in the process information 114.

The determination flow includes suitability calculation processing executed by the suitability calculation module 109 (Step 701), use history determination processing executed by the use history determination module 110 (Step 702), execution performance determination processing executed by the execution performance determination module 111 (Step 703), common defect handling history determination processing executed by the common defect handling history determination module 112 (Step 704), and priority calculation processing executed by the priority calculation module 113 (Step 705). The processing executed in each of the above-mentioned steps is described in detail with reference to FIG. 9 to FIG. 13 and the like.

It should be noted that, in Step 705, the priority calculation module 113 outputs information indicating the calculated priority (such as priority itself or information created based on the priority) from the output apparatus 204 to a user, or outputs the information from the communication interface 205 to the operation terminal 102. The operation terminal 102 outputs the information indicating the priority acquired from the management server 101 from the output apparatus 123 to the user. Examples of the information output from the output apparatus 204 or 123 are described in detail with reference to FIG. 8A and FIG. 8B.

The determination flow may further include processing (not shown) other than the above-mentioned pieces of processing, or may not include some of those pieces of processing.

As the determination flow illustrated in FIG. 7, the suitability calculation processing (Step 701), the use history determination processing (Step 702), the execution performance determination processing (Step 703), and the common defect handling history determination processing (Step 704) are described so as to be sequentially executed in the stated order, but those pieces of processing may be executed in an order different from the above-mentioned order, or all the pieces of processing may be executed in parallel. For example, the suitability calculation module 109 may execute the suitability calculation processing, to thereby calculate the evaluation value, and the use history determination module 110, the execution performance determination module 111, and the common defect handling history determination module 112 may execute the use history determination processing, the execution performance determination processing, and the common defect handling history determination processing, respectively, for the process having an evaluation value equal to or larger than an arbitrary threshold value, to thereby further change the evaluation value calculated by the suitability calculation module 109.

The suggestion processing represented by the determination flow is processing for receiving the information for specifying the process and the problem portion and the information for specifying the operation target apparatus and the date/time as the input, executing the suitability calculation processing, the use history determination processing, the execution performance determination processing, and the common defect handling history determination processing by use of the process information 114, the system configuration information 115, the use history 116, and the execution performance 117, and calculating the priority from results of those pieces of processing, to thereby suggest a process, which is determined to be high in possibility that the failure cause of the process supplied as the input at the specified portion in the configuration of the operation target apparatus supplied as the input at the specified date/time is solved, from among the original process or a plurality of kinds of derivative process of the process supplied as the input.

It should be noted that the suggestion processing may not use system configuration information. The suggestion processing executed without use of the system configuration information is described herein as a second embodiment of this invention.

As described later, the suggestion processing according to the second embodiment is processing for receiving the information for specifying the process and the problem portion as the input, executing the suitability calculation processing, the use history determination processing, the execution performance determination processing, and the common defect handling history determination processing by use of the process information 114, the use history 116, the execution performance 117, and calculating the priority from results of those pieces of processing, to thereby suggest a process, which is determined to be high in possibility that the failure cause of the process supplied as the input at the specified portion is solved, from among the original process or a plurality of kinds of derivative processes of the process supplied as the input.

FIG. 8A and FIG. 8B are examples of a screen (hereinafter referred to as "output screen") through which the processing result of the determination flow conducted by the management server 101 is to be output to the output apparatus 123 or the output apparatus 204 according to the first embodiment of this invention.

The results of the suggestion processing obtained when the execution of Part A of Process X 1.0.0 exemplified in FIG. 3 fails are illustrated in FIG. 8A and FIG. 8B.

An output screen 801 displays a processing result 802A of the determination flow or a processing result 802B of the determination flow.

The processing result 802A of the determination flow has a table format, and is formed of at least one row. Each row corresponds to one process. Every row excluding an exceptional row includes four columns. In this case, the four columns are a process identifier 804 for specifying a given process corresponding to each row (hereinafter referred to as "the given process" in the descriptions made with reference to FIG. 8A and FIG. 8B), a comprehensive evaluation 805 indicating the priority of the given process calculated by the determination flow, an evaluation reason 806 indicating a reason that the evaluation value of the given process was calculated by the determination flow, and a detailed evaluation reason 807 indicating details of the evaluation reason 806 for the given process.

The processing result 802B of the determination flow also has a table format, and is formed of at least one row. Each row corresponds to one process. Every row includes five columns. In this case, the five columns are the process identifier 804, the comprehensive evaluation 805, an evaluation item 808 indicating a plurality of evaluation items respectively corresponding to the processing of Step 701, Step 702, Step 703, and Step 704 illustrated in FIG. 7, an evaluation value 809 indicating the processing result of each of the above-mentioned evaluation items, and the detailed evaluation reason 807.

The exceptional row of the processing result 802A is a row for displaying the process supplied as the input for the suggestion processing (that is, process to be substituted by the derivative process). The exceptional row includes two columns. In this case, the two columns are the process identifier 804 and the comprehensive evaluation 805. Further, the column of the process identifier 804 of the exceptional row may display a description (for example, "Modify Process X") for prompting a job for modifying the process instead of displaying a process identifier.

Each row of the processing result of the determination flow may further include a column (not shown) other than those, or may not include some of those columns.

In FIG. 8A and FIG. 8B, the processing result of the determination flow is displayed in one table, but the processing result of the determination flow may be displayed while being divided into a plurality of tables.

The comprehensive evaluation 805 may be displayed with a qualitative symbol such as the double circle shown in FIG. 8A or the like or "S" shown in FIG. 8B, may be displayed with a quantitative numerical value such as "98 points" shown in FIG. 8A or the like, or may be graphically displayed by using, for example, a percentage or a graph (not shown). In this example, "98 points" or the like is a display example of the calculated evaluation value itself, and the double circle or the like and "S" or the like are display examples of a level in excellence of an evaluation defined based on the evaluation value (for example, as in the double circle or "S" displayed when the evaluation value is equal to or larger than 80 points).

The evaluation reason 806 of FIG. 8A displays only the reason for the evaluation given the highest evaluation value from among the evaluations obtained in the processing of Step 701 to Step 704 illustrated in FIG. 7, but as in FIG. 8B, the evaluation reason 806 may display the results of all the pieces of processing of Step 701 to Step 704, or may display the results of some of the pieces of processing.

For example, the evaluation reason 806 in the top row within FIG. 8A includes the value "Evaluation value based on use history is high", which indicates that the evaluation value obtained in the use history determination processing (Step 702) has been high within the processing flow illustrated in FIG. 7 (more specifically, that Yes was determined in Step 1004 of FIG. 10 described later and that the evaluation value was raised in Step 1005 of FIG. 10).

The detailed evaluation reason 807 displays the reason that the evaluation indicated by the evaluation reason 806 becomes high.

The evaluation item 808 indicates the items evaluated by the respective pieces of the processing of Step 701 to Step 704, and the evaluation value 809 indicates the calculation results of the evaluation values obtained in the respective pieces of processing of Step 701 to Step 704. The evaluation value 809 may display the evaluation value itself by a numerical value, or may display, for example, a graphic form or the like indicating the evaluation value such as star-shaped symbols whose number corresponds to the evaluation value.

Some specific examples of a method of representing the detailed evaluation reason 807 are described. Detailed meanings of some wordings used in the following specific examples are described in the descriptions of FIG. 9 and the subsequent figures.

(1) The detailed evaluation reason 807 corresponding to the suitability calculation processing (Step 701) uses the information acquired in the suitability calculation processing, and can be described by displaying "Problem portion has been changed." when there is a change only in the problem portion, displaying "Problem portion and data source portion have been changed." when there is a change only in the problem portion and a data source portion thereof, displaying "Data source portion of problem portion has been changed." when there is a change only in the data source portion of the problem portion, further displaying "Different defect due to change in another portion is hardly caused." when there is no change in a portion other than the problem portion or the data source portion of the problem portion, and displaying "Different defect due to change in another portion can be caused." when there is a change in the portion other than the problem portion or the data source portion of the problem portion. In addition, when the part of any portion such as the problem portion has been changed, as in FIG. 8B, the name of the parts before and after the change may be displayed in the detailed evaluation reason 807.

(2) The detailed evaluation reason 807 corresponding to the use history determination processing (Step 702) uses the information acquired in the use history determination processing, and can be described by setting all host names or a total host count of hosts that have used the given process as the succeeding process of a problem process that has caused a problem as "Character String 1", and displaying "'Character String 1' hosts have used given process as succeeding process of problem process."

(3) The detailed evaluation reason 807 corresponding to the execution performance determination processing (Step 703) can be described by setting, in the information acquired in the execution performance determination processing, the name of the operation target apparatus high in execution success probability of the given process as "Character String 1" and the execution success probability at the apparatus indicated by Character String 1 as "Numerical Value 1", and displaying "Because execution success probability at 'Character String 1' is 'Numerical Value 1'%."

Further, a case where a success probability of the given process is mostly high may be described as "Total success probability is high.", and a case where a total execution count is not enough to suitably calculate the evaluation value may be described as "Total execution count is small." Further, for example, the result of retrieving the execution performance under a condition such as the execution probability during the past one month may be displayed as "Most recent execution success probability is high." or "Most recent execution failure probability is high."

(4) The detailed evaluation reason 807 corresponding to the common defect handling history determination processing (Step 704) uses the information acquired in the common defect handling history determination processing, and can be represented by setting the number of apparatus for which the given process has been subjected to the execution registration as the succeeding process of a process that has failed to execute due to a common defect (that is, process that has failed to execute due to the same cause of the same part content) as "Numerical Value 1", and displaying "Common defect has been handled by "Numerical Value 1" hosts." When "Numerical Value 1" is 0, the description that "there is no history of handling common defect." may be displayed.

In the evaluation reason 806 and the detailed evaluation reason 807, as shown in FIG. 8A and FIG. 8B, an evaluation reason described in a natural language may be displayed, all or a part of the pieces of information used in the determination flow may be displayed, a graphical representation may be displayed so that those pieces of information are displayed in, for example, a graph format, or a link to a data source used to calculate the evaluation value may be displayed.

As described above, the evaluation reason 806 and the detailed evaluation reason 807 include information indicating the reason that the evaluation value has increased, and the reason can be identified based on which determination of which processing has resulted in the increase in the evaluation value.

The processing result 802A or the processing result 802B of the determination flow may be output by sound instead of being displayed as the output screen 801 on the output apparatus 123 or the output apparatus 204, or may be stored in the storage apparatus 206 by being stored in, for example, a file format.

As described above, the output screen is configured to display all or some of the process identifier 804, the rank 803, the process identifier 804, the comprehensive evaluation 805, the evaluation reason 806, and the detailed evaluation reason 807 on the same screen.

Further, on the output screen, all the processes for which the calculation result from the priority calculation module 113 exceeds the threshold value may be displayed, several processes ranked highest in the calculation result from the priority calculation module 113 may be displayed, or several highest ranked processes among the processes for which the calculation result from the priority calculation module 113 exceeds the threshold value may be displayed.

For example, when the process content to be used as the alternative process to the process that has failed to execute is determined by the user of the information processing system such as the operation administrator, in order to allow a comprehensive decision to be made from the viewpoints of:

(1) whether or not there is a possibility that the problem (that is, cause of the failure) has been solved in the alternative process;
(2) whether or not there is a possibility that the alternative process may cause another problem;
(3) whether or not the alternative process is a process content that is widely used;
(4) how high the execution performance of the alternative process is; and
(5) which process content another person (user) uses for the common problem, the management server 101 displays the results of the processing corresponding to the viewpoints (1) to (5) (that is, the suitability calculation processing, the use history determination processing, the execution performance determination processing, and the common defect handling history determination processing that are described later) on the same screen in descending order of the comprehensive evaluation value (that is, priority). With this configuration, it is possible to reduce such a workload imposed on the user as to refer to various GUIs to determine whether or not the suggested process content can be used.

For example, when the failure cause is the defect of the part, it is first confirmed in the suitability calculation processing that the part that has caused the defect has been changed, and when the failure cause is an illegal input value, it is confirmed that the data source portion of the specified portion has been changed. Further, when the failure cause is the system configuration change, it is confirmed that the part that has caused the defect has been replaced by a part corresponding to the configuration after the change. After the above-mentioned confirmation, it is confirmed that there is no change in a portion other than the above-mentioned portion. In addition, by confirming the handling of the common defect, the execution performance, and the use history of another person, it is confirmed that there is no problem with the handling of the fault.

Figure 9:
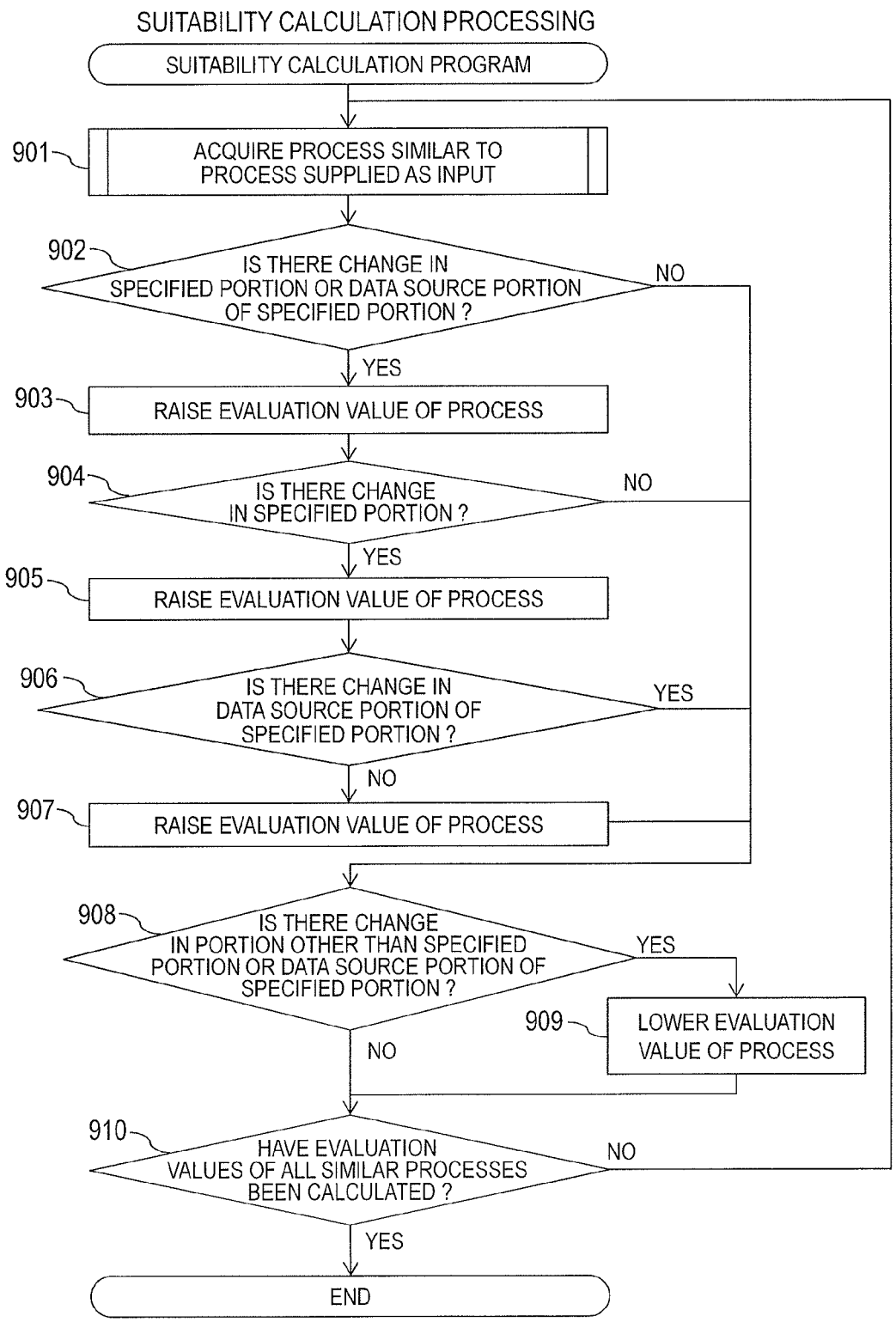
FIG. 9 is an example of a flowchart for illustrating a suitability calculation processing executed by a suitability calculation module of the management server according to the first embodiment of this invention.

FIG. 9 is an example of a flowchart for illustrating the suitability calculation processing executed by the suitability calculation module 109 of the management server 101 according to the first embodiment of this invention.

The suitability calculation processing is activated in response to an instruction issued by, for example, the user of the information processing system such as the operation administrator through the input apparatus 122 or the input apparatus 203. For example, the user of the information processing system may activate the suitability calculation processing when one of the processes fails to execute. At this time, the user of the information processing system may specify the process that has failed to execute and the part content among part contents forming the process that has actually failed to execute, as the target of the processing.

Further, the activation of the suitability calculation processing may be triggered by the failure in the execution of the process on the management target apparatus, by the configuration change of the management target apparatus, by the change in the process information 114, or by some tool or utility (not shown).

Figure 14:
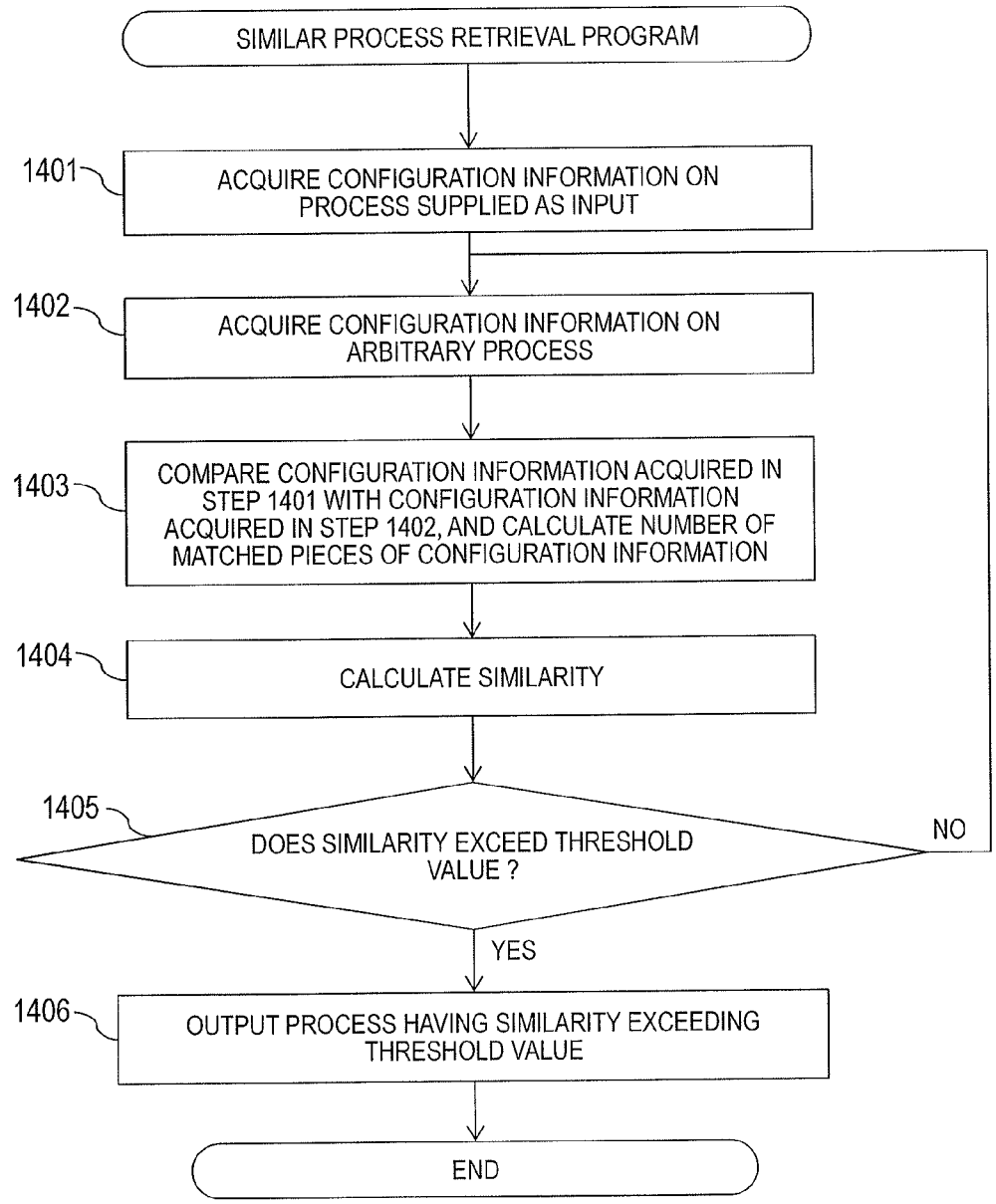
FIG. 14 is an example of a flowchart for illustrating a similar process retrieval processing executed by the management server according to the first embodiment of this invention.

In the processing of FIG. 9, the suitability calculation module 109 further calls and executes similar process retrieval processing illustrated in FIG. 14.

The suitability calculation processing includes the processing from Step 901 to Step 910, but may further include processing (not shown) such as, for example, processing for lowering the evaluation value of the process that has not been acquired in the similar process retrieval processing, or may not include some of those steps.

The suitability calculation processing illustrated in FIG. 9 is described in detail.

First, the suitability calculation module 109 acquires a process similar to the process (hereinafter referred to as "the given process" in the description made with reference to FIG. 9) to be subjected to the suitability calculation processing (Step 901). For example, when the user of the information processing system activates the suitability calculation module 109, the given process is a process specified by the user of the information processing system. In that case, in addition to the information for specifying the given process, information for specifying the failed portion (that is, part content that has failed to execute) is also input. When the suitability calculation module 109 is activated concurrently with the failure in the execution of the process on the management target apparatus, the given process is the process that has failed to execute, and the failed portion is the part content that has failed to execute. When the suitability calculation module 109 is activated concurrently with the change in the process information 114, the given process is the changed process.

In Step 901, the suitability calculation module 109 calls and executes the similar process retrieval processing. Details thereof are described later with reference to FIG. 14.

After that, the suitability calculation module 109 calculates the evaluation value of the process held in the process information 114 by processing for raising the evaluation value of a process that has been changed in one of or a plurality of ones of the failed portion of the given process and the data source portions of the failed portion of the given process and lowering the evaluation value of a process that has been changed in a portion other than any one of the failed portion of the given process and the data source portions of the failed portion of the given process.

Specifically, the suitability calculation module 109 determines whether or not at least one of the specified portion or the data source portion of the specified portion of the process acquired in Step 901 (hereinafter referred to as "similar process" in the description made with reference to FIG. 9) has been changed (Step 902).

In this case, the specified portion represents a portion corresponding to the failed portion of the given process among at least one portion (that is, part content) forming the similar process. The failed portion of the given process may be specified by the user of the information processing system, or may be automatically detected when the process fails to execute on the management target apparatus. When the suitability calculation module 109 is activated concurrently with the change in the process information 114, the portion of the similar process corresponding to the changed part content of the changed process may be handled as the specified portion. The data source portion of the specified portion is described later.

When at least one of the specified portion of the similar process and the data source portion of the specified portion has been changed, the suitability calculation module 109 raises the evaluation value of the similar process (Step 903). For example, the suitability calculation module 109 may increase the evaluation value by a predetermined value (the same applies to the following).

Subsequently, the suitability calculation module 109 determines whether or not the specified portion of the similar process has been changed (Step 904). Specifically, the suitability calculation module 109 determines that the specified portion has been changed when the specified portion of the similar process is not the same part content as the failed portion of the given process.

When the specified portion has been changed, the suitability calculation module 109 further raises the evaluation value of the similar process (Step 905).

Subsequently, the suitability calculation module 109 determines whether or not the data source portion of the specified portion has been changed (Step 906). Specifically, the suitability calculation module 109 determines that the data source portion of the specified portion has been changed when the data source portion of the specified portion of the similar process is not the same part content as the data source portion of the failed portion of the given process.

When the data source portion of the specified portion has not been changed, the suitability calculation module 109 further raises the evaluation value of the similar process (Step 907).

Subsequently, the suitability calculation module 109 determines whether or not a portion other than the specified portion of the similar process or the data source portion of the specified portion has been changed (Step 908). Specifically, the suitability calculation module 109 determines that the portion other than the specified portion of the similar process or the data source portion of the specified portion has been changed when the portion other than the specified portion of the similar process or the data source portion of the specified portion is not the same part content as the portion of the given process corresponding to the above-mentioned portion.

When the portion other than the specified portion of the similar process or the data source portion of the specified portion has been changed, the suitability calculation module 109 lowers the evaluation value of the similar process (Step 909). For example, the suitability calculation module 109 may reduce the evaluation value by a predetermined value (the same applies to the following).

Subsequently, the suitability calculation module 109 determines whether or not the evaluation values of all the similar processes have been calculated (Step 910). When at least one of the evaluation values of the similar processes has not been calculated, the processing returns to Step 901. When the evaluation values of all the similar processes have been calculated, the suitability calculation processing is brought to an end.

It should be noted that, when determining in Step 902 that none of the specified portion and the data source portion of the specified portion has been changed, the suitability calculation module 109 executes Step 908 without executing any one of Step 903 to Step 907. When determining in Step 904 that the specified portion has not been changed, the suitability calculation module 109 executes Step 908 without executing any one of Step 905 to Step 907. When determining in Step 906 that the data source portion of the specified portion has been changed, the suitability calculation module 109 executes Step 908 without executing Step 907. When determining in Step 908 that the portion other than the specified portion of the similar process or the data source portion of the specified portion has not been changed, the suitability calculation module 109 executes Step 910 without executing Step 909.

As described above, in the suitability calculation processing illustrated in FIG. 9, the evaluation values of the respective processes are calculated so that, among the processes in which the specified portion or the data source portion of the specified portion has been changed, the evaluation value of the process in which only the specified portion has been changed is the highest, the evaluation value of the process in which both the specified portion and the data source portion of the specified portion have been changed is the second highest, and the evaluation value of the process in which only the data source portion of the specified portion has been changed is the third highest. Now, the reason that the evaluation value is calculated in this manner is described.

For example, when one process is used for a plurality of management target apparatus, there is a possibility that a failure for the same cause as that of the failure of the given process on one management target apparatus has already occurred on another management target apparatus. In addition, there is a possibility that a new process for which the cause of the failure has been solved has already been created by the administrator of the another management target apparatus and held on the management server 101. In this case, there is a possibility that the new process can be used as the alternative process to the given process that has failed. Alternatively, when the cause of the failure of the given process on the one management target apparatus is an undesirable alteration made to the given process and when an old process to which the alteration has not been made is still held on the management server 101, there is a possibility that the old process can be used as the alternative process to the given process that has failed.

The suitability calculation module 109 calculates the evaluation values of the respective processes so that a high evaluation value is given to a process high in possibility that the process can be used as the alternative process. Specifically, when the failed portion of the given process is clear, an estimation that the cause of the failure lies in at least one of the failed portion or the data source portion (described later) of the failed portion and does not lie in the portion other than those is used. Based on this estimation, it is more likely that the process in which at least one of the portion (specified portion) corresponding to the failed portion of the given process and the data source portion of the specified portion has been changed can be used as the alternative process to the given process than the process other than the above-mentioned process. On the other hand, it is less likely that the process in which the portion other than any one of the specified portion and the portion corresponding to the data source portion of the specified portion has been changed can be used as the alternative process to the given process because there is a possibility that the above-mentioned process includes a cause of another failure even when the process does not include the cause of the failure that has occurred in the given process.

More specifically, based on the estimation that the possibility that the cause of the failure lies only in the failed portion is the highest, the possibility that the cause lies in both the failed portion and the data source portion of the failed portion is the second highest, and the possibility that the cause lies only in the data source portion of the failed portion is the third highest, the evaluation values are calculated so that the evaluation value of the process in which only the specified portion has been changed is the highest, the evaluation value of the process in which both the specified portion and the data source portion of the specified portion have been changed is the second highest, and the evaluation value of the process in which only the data source portion of the specified portion has been changed is the third highest.

Now, an example of the above-mentioned evaluation is described by representing a process formed of Part Content A, Part Content B to which an output from Part Content A is input, and Part Content C to which an output from Part Content B is input as "A, B, C", and by representing the part contents having different versions respectively corresponding to the part contents A, B, and C as part contents A', B', and C'. In this example, when Part Content B within the process "A, B, C" has failed to execute (that is, the specified portion is B and the data source portion of the specified portion is A), the similar process to the process "A, B, C" is retrieved. As a result, it is assumed that similar processes "A', B, C", "A, B', C", "A, B, C'", "A', B', C", "A', B, C'", and "A, B', C'" have been retrieved.

In this case, in a process "A, B, C", a problem (that is, cause of the failure) with the specified portion B and the data source portion A of the specified portion has not been solved, and there is also a possibility that the change in the portion C other than the specified portion or the data source portion of the specified portion may cause another problem.

In the processes "A', B, C'" and "A, B', C'", there is a possibility that the problem has been solved, but there is a possibility that the change in the portion C may cause another problem.

On the other hand, in the processes "A', B, C", "A, B', C", and "A', B', C", there is a possibility that the problem has been solved, and the possibility that another problem may be caused is low. In this case, an example of a case where the problem is solved by "A', B, C" is a case where the cause of the failure in the execution of Part Content B does not lie in Part Content B itself but lies in an imperfection in output (for example, error in format of a file to be output) of Part Content A while the imperfection has been solved at Part Content A'.

In such a case, in the suitability calculation processing illustrated in FIG. 9, the highest evaluation values are given to the processes "A, B', C", "A', B', C", "A', B, C", "A, B', C'", "A', B, C'", and "A, B, C'" in the stated order. In this manner, with the suitability calculation processing, it is possible to suggest the process with which the problem is highly likely to have been solved in a short time without requiring the user's time and labor. For example, the user can use those processes as the alternative processes to the failed process in descending order of the evaluation value. This allows the user to preferentially use the process with which the problem is highly likely to have been solved.

However, the above-mentioned calculation method for the evaluation value is merely an example, and for example, the evaluation values of the processes in the above-mentioned three categories may be calculated to be the same, or may be calculated so that a relationship between the processes of the respective categories and the supplied evaluation values becomes different from that exemplified in FIG. 9. For example, when an estimation that the possibility that the cause of the failure lies only in the data source portion of the failed portion is higher than the possibility that the cause lies in both the failed portion and the data source portion of the failed portion is obtained empirically, the evaluation values may be calculated so that the evaluation value of the process in which only the data source portion of the specified portion has been changed becomes higher than the evaluation value of the process in which both the specified portion and the data source portion of the specified portion have been changed.

It should be noted that the data source portion of the specified portion represents a portion that may affect a success/failure in the execution of the specified portion among the portions other than the specified portion. Specifically, for example, all portions serving as generation sources of data to be input to the specified portion and all portions serving as generation sources of execution environments for the specified portion are the data source portions of the specified portion. When the data source portion of the specified portion further has another data source portion, the another data source portion may be also handled as the data source portion of the specified portion.

The description is made by taking as an example a case where, for example, the process that has failed to execute (the given process) is formed of three portions (part contents), a second portion is executed subsequently to a first portion, a third portion is executed subsequently to the second portion, and the third portion is input as the specified portion. In this example, in cases where data output from the first portion is received by the specified portion as the input and where the specified portion operates hardware or software activated by the first portion, the first portion is the data source portion of the specified portion.

To describe a specific example with reference to the process information 114 of FIG. 3, when the specified portion is Part C of Process X v1.0.0, Part A that outputs "A_out1" to be input to Part C and Part B that outputs "B_out0" to be input to Part C are the data source portions of Part C. It should be noted that "A_out0" output from Part A is input to Part B serving as the data source portion of Part C. In other words, Part A also serves as the data source portion of Part B, and hence Part A is the data source portion of Part C also in this sense.

In addition, for example, when the specified portion is Part C of Process Y v1.0.0, an output "D_out0" from Part D is not to be input to Part C, but the operation target management objects 307 of those parts are both X_in1, and hence Part D is the data source portion of Part C.

Figure 10:
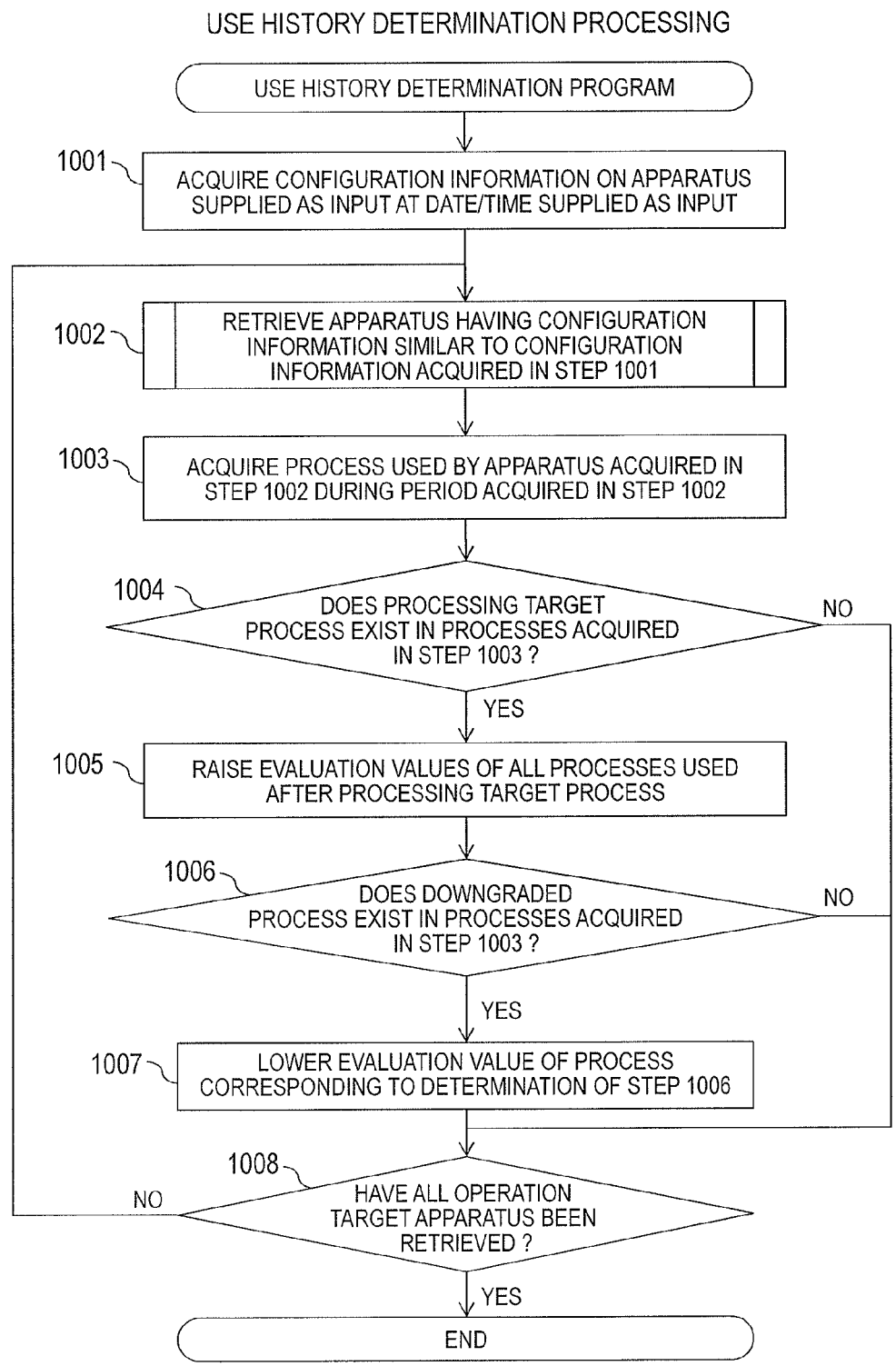
FIG. 10 is an example of a flowchart for illustrating a use history determination processing executed by a use history determination module of the management server according to the first embodiment of this invention.

FIG. 10 is an example of a flowchart for illustrating the use history determination processing executed by the use history determination module 110 of the management server 101 according to the first embodiment of this invention.

In the same manner as the suitability calculation processing, the activation of the use history determination processing may be triggered by the instruction issued by, for example, the user of the information processing system such as the operation administrator through the input apparatus 122 or the input apparatus 203, by the failure in the execution of the process on the management target apparatus, by the configuration change of the management target apparatus, by the change in the process information 114, or by some tool or utility (not shown).

Figure 15:
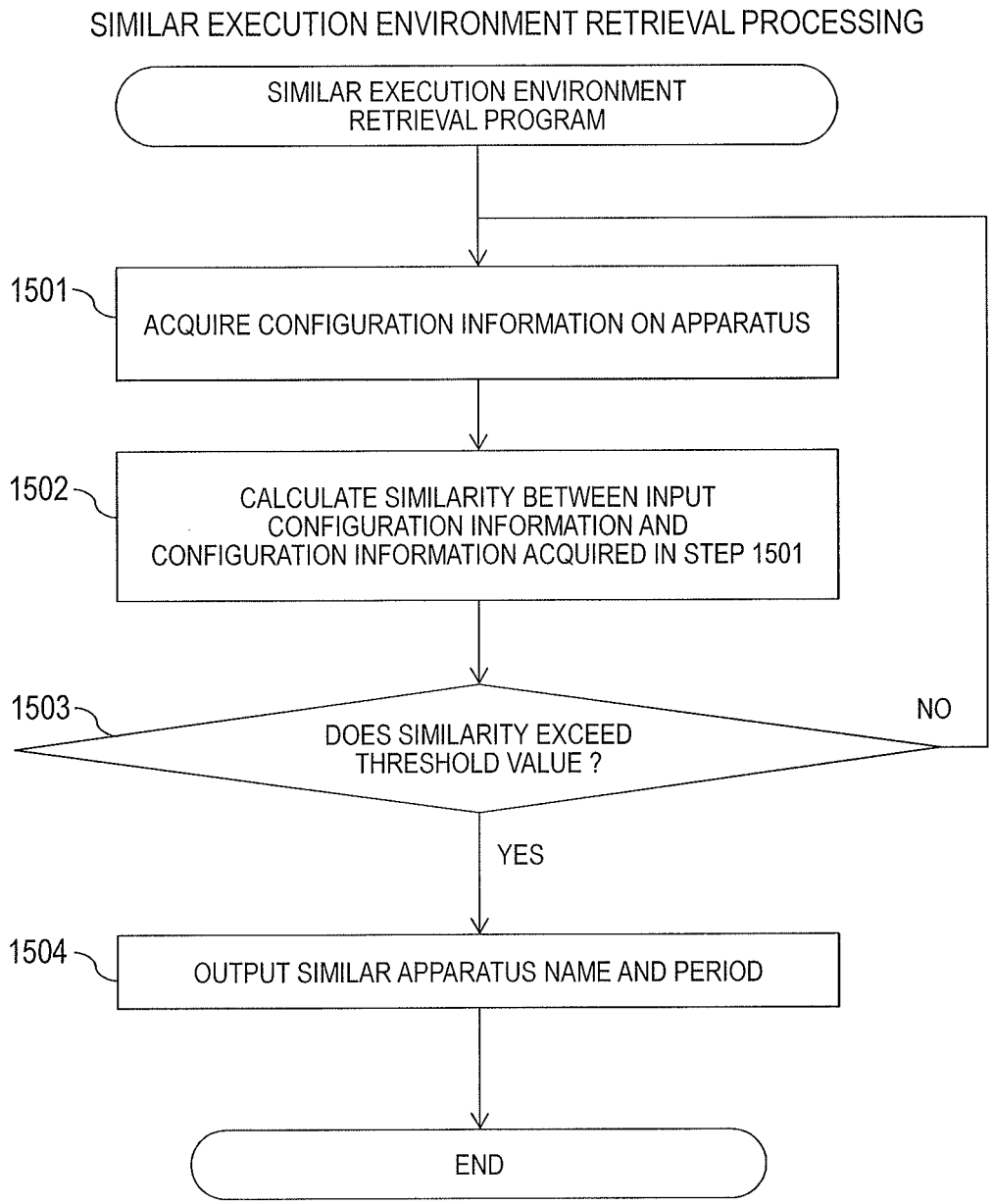
FIG. 15 is an example of a flowchart for illustrating a similar execution environment retrieval processing executed by the management server according to the first embodiment of this invention.

In the processing of FIG. 10, the use history determination module 110 further calls and executes similar execution environment retrieval processing illustrated in FIG. 15.

Further, the use history determination processing illustrated in FIG. 10 includes the processing of Step 1001 to Step 1008, but may further include the processing (not shown) other than those, or may not include some of those.

The use history determination processing illustrated in FIG. 10 is described in detail.

First, the use history determination module 110 receives the information for specifying a processing target process, an operation target apparatus, and a date/time as an input (Step 1001). For example, when the use history determination processing is activated in response to the instruction issued by the user of the information processing system, those pieces of information are input by the user of the information processing system. When the use history determination processing is activated concurrently with the failure in the execution of the process on the management target apparatus, information for specifying the process that has failed to execute, the management target apparatus on which the failure has occurred, and the date/time at which the failure occurred (that is, date/time at which the process that has failed to execute was executed) is input as the information for specifying the processing target process, the operation target apparatus, and the date/time.

Subsequently, the use history determination module 110 uses the system configuration information 115 and the use history 116, acquires the configuration information on the operation target apparatus supplied as the input at the date/time supplied as the input, and executes the similar execution environment retrieval processing (Step 1002). Accordingly, a period during which the configuration information on an apparatus that has the configuration information similar to the configuration information acquired in Step 1001 or had the similar configuration information has been similar to the configuration information on the apparatus supplied as the input is acquired. This processing is described later in detail with reference to FIG. 15.

Subsequently, the use history determination module 110 acquires use history information on the apparatus acquired in Step 1002 during the period acquired in Step 1002 (Step 1003).

Subsequently, the use history determination module 110 determines whether or not a history of a process matching the process supplied as the input is included in the use history information acquired in Step 1003 (Step 1004).

When the history of the process matching the process supplied as the input is included in the use history information acquired in Step 1003, the use history determination module 110 raises evaluation values of all the processes used as the succeeding process of the process matching the process supplied as the input (Step 1005).

Subsequently, the use history determination module 110 determines whether or not a downgraded process is included in the succeeding processes of the process matching the process supplied as the input, which are included in the use history information acquired in Step 1003 (Step 1006). Specifically, a process used during a period sandwiched by two use periods of one process among all the processes used as the succeeding process of the process matching the process supplied as the input is the downgraded process. The use history determination module 110 lowers the evaluation value of the downgraded process (Step 1007).

Subsequently, the use history determination module 110 determines whether or not the retrieval of all the operation target apparatus has been finished (Step 1008). When the retrieval has not been finished, the processing returns to Step 1002, and when the retrieval has been finished, the calculation of the evaluation value of the process, which has been conducted in the use history determination processing, is brought to an end.

It should be noted that, when determining in Step 1004 that the history of the process matching the process supplied as the input is not included, the use history determination module 110 executes Step 1008 without executing any one of Step 1005 to Step 1007. When determining in Step 1006 that the downgraded process is not included, the use history determination module 110 executes Step 1008 without executing Step 1007.

The use history determination processing is described by taking a specific example thereof. For example, it is assumed that the execution of Process A has failed in a certain operation target apparatus S. In this case, the use history determination module 110 retrieves the system configuration information 115, and retrieves another management target apparatus having a configuration similar to that of the operation target apparatus S (Step 1002). As a result, when a management target apparatus S' having a configuration similar to that of the operation target apparatus S during a certain period T is found (that is, the configuration of the management target apparatus S' during the period T is similar to the configuration of the operation target apparatus S at the time when Process A failed to execute), the use history determination module 110 refers to the use history 116, to identify the process used on the management target apparatus S' during a period from the start of the period T until the end of the period T (Step 1003). It is assumed, as a result, that Process A, Process B, Process C, Process D, Process B, and Process E were used in the stated order.

In this case, the use history determination module 110 raises the evaluation values of Process B, Process C, Process D, and Process E (Step 1005). This is because when Process A includes the cause of the failure, there is a possibility that the cause of the failure has been solved in the succeeding process used in actuality. In particular, on the management target apparatus S' having the configuration similar to that of the operation target apparatus S during the period T, there is a possibility that Process A has failed to execute due to the same cause as that of the failure that has occurred in the operation target apparatus S, and the possibility that the cause of the failure has been solved in the succeeding process of Process A on the management target apparatus S' becomes higher.

In addition, in this example, Process B, Process C, and Process D are used in order after Process A, and then Process B is used again. In this case, Process C and Process D used during the period sandwiched between the two periods during which Process B was used correspond to the downgraded processes. Therefore, the use history determination module 110 lowers the evaluation values of Process C and Process D (Step 1007). This is because there is a possibility that a new problem occurred in Process C and Process D and that Process B has been used again in order to solve the problem (that is, the possibility that Processes C and D can be used as the alternative processes is lower than the possibility that the process that is not downgraded, such as Process B, can be used).

For example, when Part Content B within the process "A, B, C" has failed to execute, and the similar process "A, B', C" and similar processes "A, B'', C" and "A, B''', C" to the process "A, B, C" are retrieved, only the same evaluation value can be given thereto in the suitability calculation processing of FIG. 9. However, according to the use history determination processing, for example, when the similar process "A, B', C" is subjected to use registration as the succeeding process of the process "A, B, C" on any one of the management target apparatus, and when another similar process is not subjected to the use registration as the succeeding process of the process "A, B, C", the similar process "A, B', C" can be given an evaluation value higher than another similar process. Accordingly, it is possible to suggest the process with which the problem is highly likely to have been solved in a short time without requiring the user's time and labor.

Figure 11:
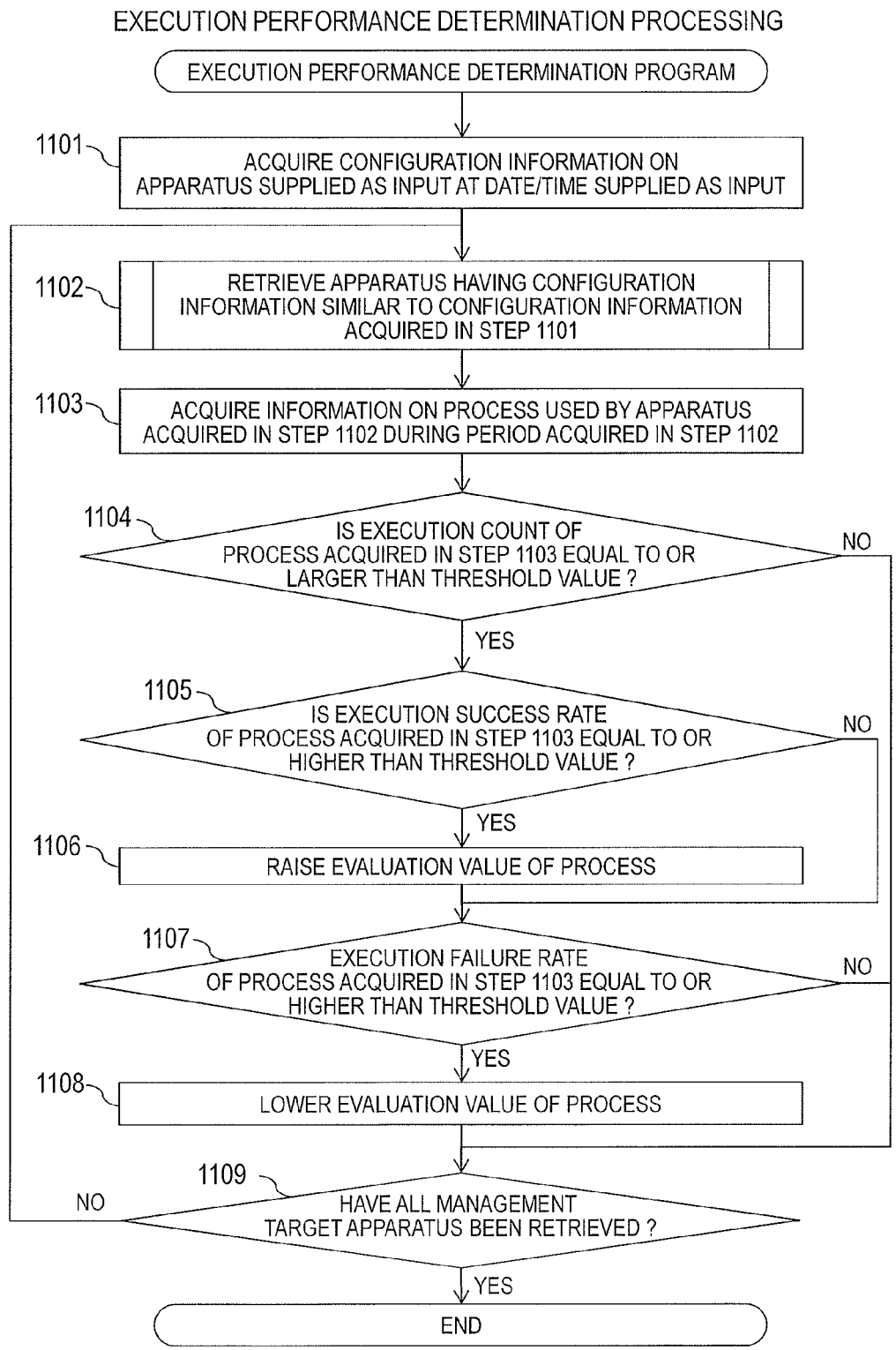
FIG. 11 is an example of a flowchart for illustrating an execution performance determination processing executed by an execution performance determination module of the management server according to the first embodiment of this invention.

FIG. 11 is an example of a flowchart for illustrating the execution performance determination processing executed by the execution performance determination module 111 of the management server 101 according to the first embodiment of this invention.

In the same manner as the suitability calculation processing and the like, the activation of the execution performance determination processing may be triggered by the instruction issued by, for example, the user of the information processing system such as the operation administrator through the input apparatus 122 or the input apparatus 203, by the failure in the execution of the process on the management target apparatus, by the configuration change of the management target apparatus, by the change in the process information 114, or by some tool or utility (not shown).

In the processing of FIG. 11, the execution performance determination module 111 further calls and executes similar execution environment retrieval processing illustrated in FIG. 15.

Further, the execution performance determination processing illustrated in FIG. 11 includes the processing of Step 1101 to Step 1109, but may further include the processing (not shown) other than those, or may not include some of those. Further, the processing of Step 1105 and Step 1106 and the processing of Step 1107 and Step 1108 may be executed in parallel, or may be executed in a reverse order.

The execution performance determination processing illustrated in FIG. 11 is described in detail.

First, the execution performance determination module 111 receives the information for specifying a processing target process, an operation target apparatus, and a date/time as an input (Step 1101). For example, when the execution performance determination processing is activated in response to the instruction issued by the user of the information processing system, those pieces of information are input by the user of the information processing system. When the execution performance determination processing is activated concurrently with the failure in the execution of the process on the management target apparatus, information for specifying the process that has failed to execute, the management target apparatus on which the failure has occurred, and the date/time at which the failure occurred is input as the information for specifying the processing target process, the operation target apparatus, and the date/time.

Subsequently, the execution performance determination module 111 uses the system configuration information 115 and the execution performance 117, acquires the configuration information on the operation target apparatus supplied as the input at the date/time supplied as the input, and executes the similar execution environment retrieval processing (Step 1102). Accordingly, a period during which the configuration information on the management target apparatus that has the configuration information similar to the configuration information acquired in Step 1101 or had the similar configuration information has been similar to the configuration information on the operation target apparatus supplied as the input is acquired. This processing is described later in detail with reference to FIG. 15.

Subsequently, the execution performance determination module 111 acquires the execution performance of the process executed on the apparatus acquired in Step 1102 during the period acquired in Step 1102 (Step 1103).

Subsequently, the execution performance determination module 111 determines whether or not the execution count of the process having the execution performance acquired in Step 1103 is equal to or larger than a predetermined threshold value (Step 1104).

When the execution count of the process having the execution performance acquired is equal to or larger than the predetermined threshold value, the execution performance determination module 111 determines whether or not the rate of success in the execution of the process having the execution performance acquired in Step 1103 is equal to or higher than a predetermined threshold value (Step 1105), and when the rate of success in the execution (that is, success probability) is equal to or higher than the predetermined threshold value, raises the evaluation value of the process (Step 1106).

Subsequently the execution performance determination module 111 determines whether or not the rate of failure in the execution of the process having the execution performance acquired in Step 1103 is equal to or higher than a predetermined threshold value (Step 1107), and when the rate of failure in the execution is equal to or higher than the predetermined threshold value, lowers the evaluation value of the process (Step 1108).

Subsequently, the execution performance determination module 111 determines whether or not the above-mentioned processing has been executed for all the management target apparatus (Step 1109). When the processing has not been finished for any one of the management target apparatus, the processing returns to Step 1102, and when the processing has been executed for all the management target apparatus, the calculation of the evaluation value of the process conducted in the execution performance determination processing is brought to an end.

It should be noted that, when determining in Step 1104 that the execution count of the process having the execution performance acquired is smaller than the predetermined threshold value, the execution performance determination module 111 executes Step 1109 without executing any one of Step 1105 to Step 1108. When determining in Step 1105 that the rate of success in the execution is smaller than the predetermined threshold value, the execution performance determination module 111 executes Step 1107 without executing Step 1106. When determining in Step 1107 that the rate of failure in the execution is smaller than the predetermined threshold value, the execution performance determination module 111 executes Step 1109 without executing Step 1108.

The execution performance determination processing is described by taking a specific example thereof.

For example, it is assumed that the execution of Process A has failed in a certain operation target apparatus S. In this case, the execution performance determination module 111 retrieves the system configuration information 115, and retrieves another management target apparatus having a configuration similar to that of the operation target apparatus S. As a result, when the management target apparatus S' having the configuration similar to that of the operation target apparatus S during the certain period T is found, the execution performance determination module 111 refers to the execution performance 117, to identify how many times each process has been executed on the management target apparatus S' and how many times the execution has been successful. It is assumed, as a result, for example, that Process A has been executed 3 times with the execution being successful 3 times, Process B has been executed 100 times with the execution being successful 98 times, Process C has been executed 100 times with the execution being successful 60 times, and Process D has been executed 4 times with the execution being successful 1 time.

In this example, for example, when the threshold value for Step 1104 is "10 times" and when the threshold value for Step 1105 and Step 1107 is "70%", the evaluation value of Process B, which has the execution count larger than the threshold value and has the success probability higher than the threshold value, is raised, while the evaluation value of Process C, which has the execution count larger than the threshold value but has the success probability lower than the threshold value, is lowered. This is because it is estimated that it is more highly likely that the process having the higher success probability can be used as the alternative process to the process that has failed to execute (that is, it is highly possible that the cause of the failure has not been solved in the process having the lower success probability).

On the other hand, irrespective of the magnitude of the execution success probability, the execution values of Process A and Process D having the execution count determined to be smaller than the threshold value in Step 1104 are not changed. This is because the execution results included in the execution performance 117 include both an execution result under a test environment and an execution result under a production environment, and because there is a possibility that the success probability of the process having a small execution count does not sufficiently reflect the execution result under the production environment. The success probability under the production environment of the process having a high success probability under the test environment is not always high, and hence in this embodiment, only the success probability of the process having a sufficiently large execution count (that is, success probability estimated to sufficiently reflect the execution result under the production environment) is used for the evaluation of the process.

It should be noted that Step 1104 may be omitted in a case where, for example, the execution result under the test environment is not cumulated in the execution performance 117.

Further, for example, when specific configuration information is combined with the process, the execution performance determination module 111 may output performance information such as whether the execution performance of the process is good or bad, or may determine the execution performance regarding a specific period.

Further, for example, when a similarity in the configuration information is high, the execution performance determination module 111 may calculate the evaluation value by adding an inclination thereto in such a manner that, for example, an increase amount or a decrease amount of the evaluation value is increased in Step 1106 or Step 1108.

Further, in a case where, for example, the execution performance determination processing is activated concurrently with an execution failure at a predetermined time point of an arbitrary process whose execution had kept successful, the execution performance determination module 111 may output differential information on the configuration information as a candidate for the failure cause when there is a change in the configuration information on the operation target apparatus during a period between a time point of the execution failure and a time point of the execution success immediately before the execution failure.

As described above, according to the execution performance determination processing, for example, a plurality of similar processes, which are given the same evaluation value in the suitability calculation processing or the use history determination processing, can be respectively given different evaluation values based on the execution performance. Accordingly, it is possible to suggest the process with which the problem is highly likely to have been solved in a short time without requiring the user's time and labor.

Figure 12:
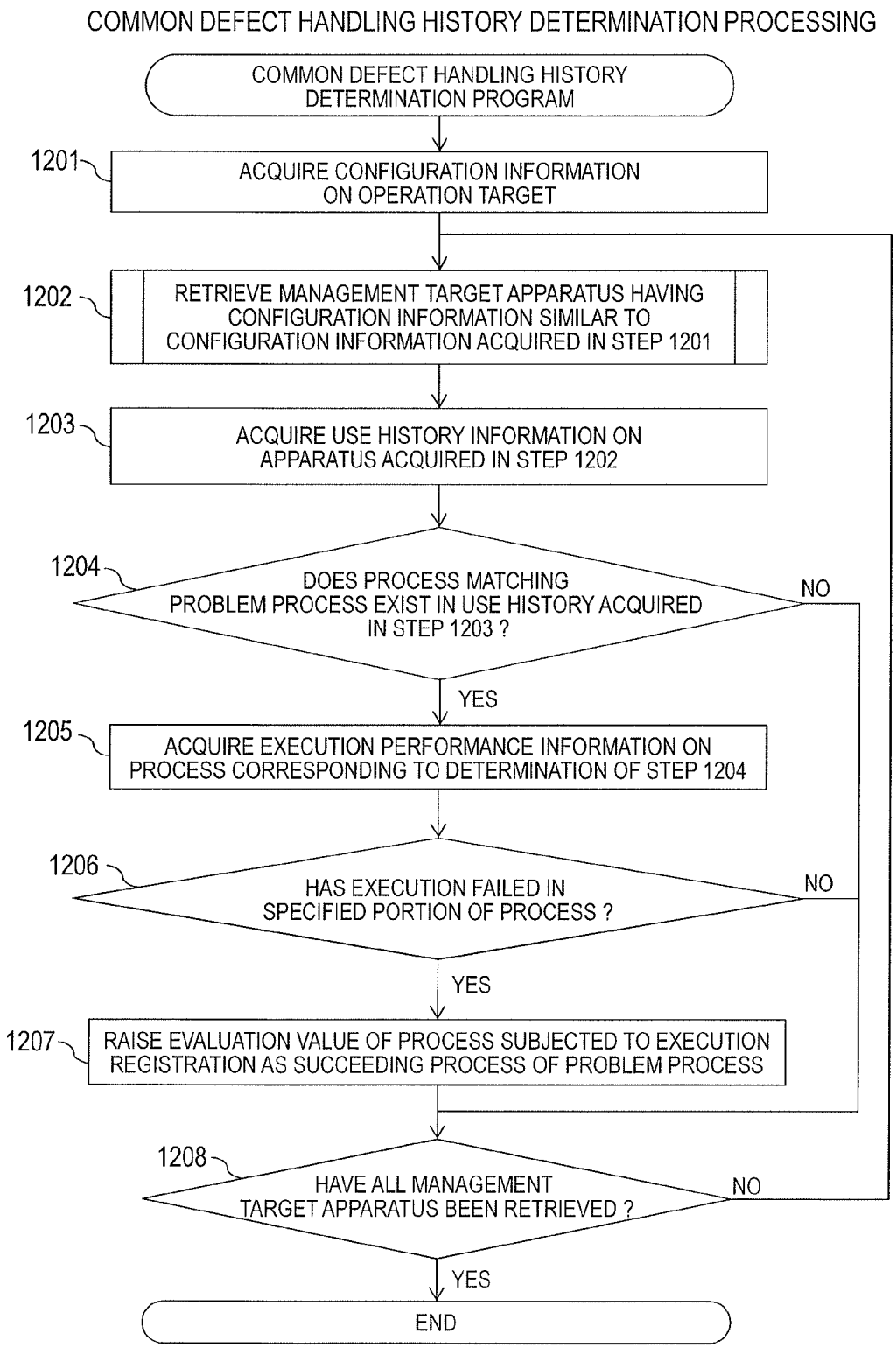
FIG. 12 is an example of a flowchart for illustrating a common defect handling history determination processing executed by a common defect handling history determination module of the management server according to the first embodiment of this invention.

FIG. 12 is an example of a flowchart for illustrating the common defect handling history determination processing executed by the common defect handling history determination module 112 of the management server 101 according to the first embodiment of this invention.

In the same manner as the suitability calculation processing, the activation of the common defect handling history determination processing may be triggered by the instruction issued by, for example, the user of the information processing system such as the operation administrator through the input apparatus 122 or the input apparatus 203, by the failure in the execution of the process on the management target apparatus, by the configuration change of the management target apparatus, by the change in the process information 114, or by some tool or utility (not shown).

In the processing of FIG. 12, the common defect handling history determination module 112 further calls and executes similar execution environment retrieval processing illustrated in FIG. 15.

The common defect handling history determination processing is processing aimed at increasing the evaluation value of the process that has been subjected to the execution registration as a countermeasure against a failure (that is, common defect) that has occurred due to the same cause as the failure cause at the failed portion supplied as the input.

The common defect handling history determination processing illustrated in FIG. 12 includes the processing of Step 1201 to Step 1208, but may further include the processing (not shown) other than those, or may not include some of those.

The common defect handling history determination processing exemplified in FIG. 12 is described in detail.

First, the common defect handling history determination module 112 receives the information for specifying a processing target process, a failed portion in that process, an operation target apparatus that is the target of the processing, and a date/time as an input (Step 1201). For example, when the common defect handling history determination processing is activated in response to the instruction issued by the user of the information processing system, those pieces of information are input by the user of the information processing system. When the common defect handling history determination processing is activated concurrently with the failure in the execution of the process on the management target apparatus, information for specifying the process that has failed to execute, a cause of the failure, the management target apparatus on which the failure has occurred, and the date/time at which the failure occurred is input as the information for specifying the processing target process, the failed portion in that process, the operation target apparatus that is the target of the processing, and the date/time.

Subsequently, the common defect handling history determination module 112 uses the system configuration information 115 and the execution performance 117, acquires the configuration information on the operation target apparatus supplied as the input at the date/time supplied as the input, and executes the similar execution environment retrieval processing (Step 1202). Accordingly, a period during which the configuration information on a management target apparatus that has the configuration information similar to the configuration information acquired in Step 1201 or had the similar configuration information has been similar to the configuration information on the operation target apparatus supplied as the input is acquired. This processing is described later in detail with reference to FIG. 15.

Subsequently, the common defect handling history determination module 112 acquires use history information on the apparatus acquired in Step 1202 during the period acquired in Step 1202 from the use history 116 (Step 1203).

Subsequently, the common defect handling history determination module 112 determines whether or not a history of a process matching the process supplied as the input is included in the use history information acquired in Step 1203 (Step 1204).

When the history of the process matching the process supplied as the input is included in the use history information acquired in Step 1203, the common defect handling history determination module 112 acquires the execution performance information on the process determined to be matched in Step 1204 from the execution performance 117 (Step 1205).

Subsequently, the common defect handling history determination module 112 determines whether or not the failed location 605 that matches the portion supplied as the input is included in the execution performance information acquired in Step 1205 (Step 1206).

When the failed location 605 that matches the portion supplied as the input is included in the execution performance information acquired in Step 1205, the common defect handling history determination module 112 identifies, based on the use history 116, the process subjected to the execution registration as the succeeding process of the process determined to be matched in Step 1204, and raises the evaluation value of the identified process (Step 1207).

Subsequently, the common defect handling history determination module 112 determines whether or not the retrieval of all the operation target apparatus has been finished (Step 1208). When the retrieval has not been finished, the processing returns to Step 1202 to retrieve the remaining operation target apparatus and execute the processing of Step 1203 and the subsequent steps therefor. When the retrieval of all the operation target apparatus has been finished, the calculation of the evaluation value of the process conducted in the common defect handling history determination processing is brought to an end.

When determining in Step 1204 that the history of the process matching the process supplied as the input is not included, the common defect handling history determination module 112 executes Step 1208 without executing any one of Step 1205 to Step 1207. When determining in Step 1206 that the failed location 605 that matches the portion supplied as the input is not included, the common defect handling history determination module 112 executes Step 1208 without executing Step 1207.

It should be noted that processing for improving accuracy of determination processing may be added to the processing of Step 1207 of FIG. 12. For example, based on the start of use 504 of the use history 116 and the execution date/time 603 of the execution performance 117, the common defect handling history determination module 112 may increase the evaluation value of the process subjected to the execution registration immediately after the execution failure occurred in the specified portion satisfying the condition of Step 1206 to a level higher than the evaluation values of the other processes. Alternatively, the common defect handling history determination module 112 may not raise the evaluation value when a period from the time point of the execution failure in the specified portion satisfying the condition of Step 1206 until the time point of the start of use of the process subjected to the execution registration as the succeeding process of the process satisfying the condition of Step 1204 is long.

Further, in a case where the failure cause of the process supplied as the input is clear (for example, information indicating the failure cause of the part content that has failed to execute has been also input), the evaluation value may be calculated by adding an inclination thereto in such a manner that, for example, the evaluation value is raised only when both the failed portion and the failure cause are matched, or the evaluation value is raised when only one of the failed portion and the failure cause is matched while a higher evaluation value is given when both the failed portion and the failure cause are matched.

For example, when Part Content B within the process "A, B, C" has failed to execute, and the similar process "A, B', C" and similar processes "A, B", C" and "A, B''', C" to the process "A, B, C" are retrieved, only the same evaluation value can be given thereto in the suitability calculation processing of FIG. 9. However, for example, when the similar process "A, B', C" is subjected to the use registration as the succeeding process of the process "A, B, C" on any one of the management target apparatus, and when the execution of Part Content B of the process "A, B, C" has failed due to the same cause as that of the process supplied as the input, it is determined that it is highly possible that the cause of the failure has been solved in the similar process "A, B', C", and the similar process "A, B', C" is given a high evaluation value. Accordingly, it is possible to suggest the process with which the problem is highly likely to have been solved in a short time without requiring the user's time and labor.

Figure 13:
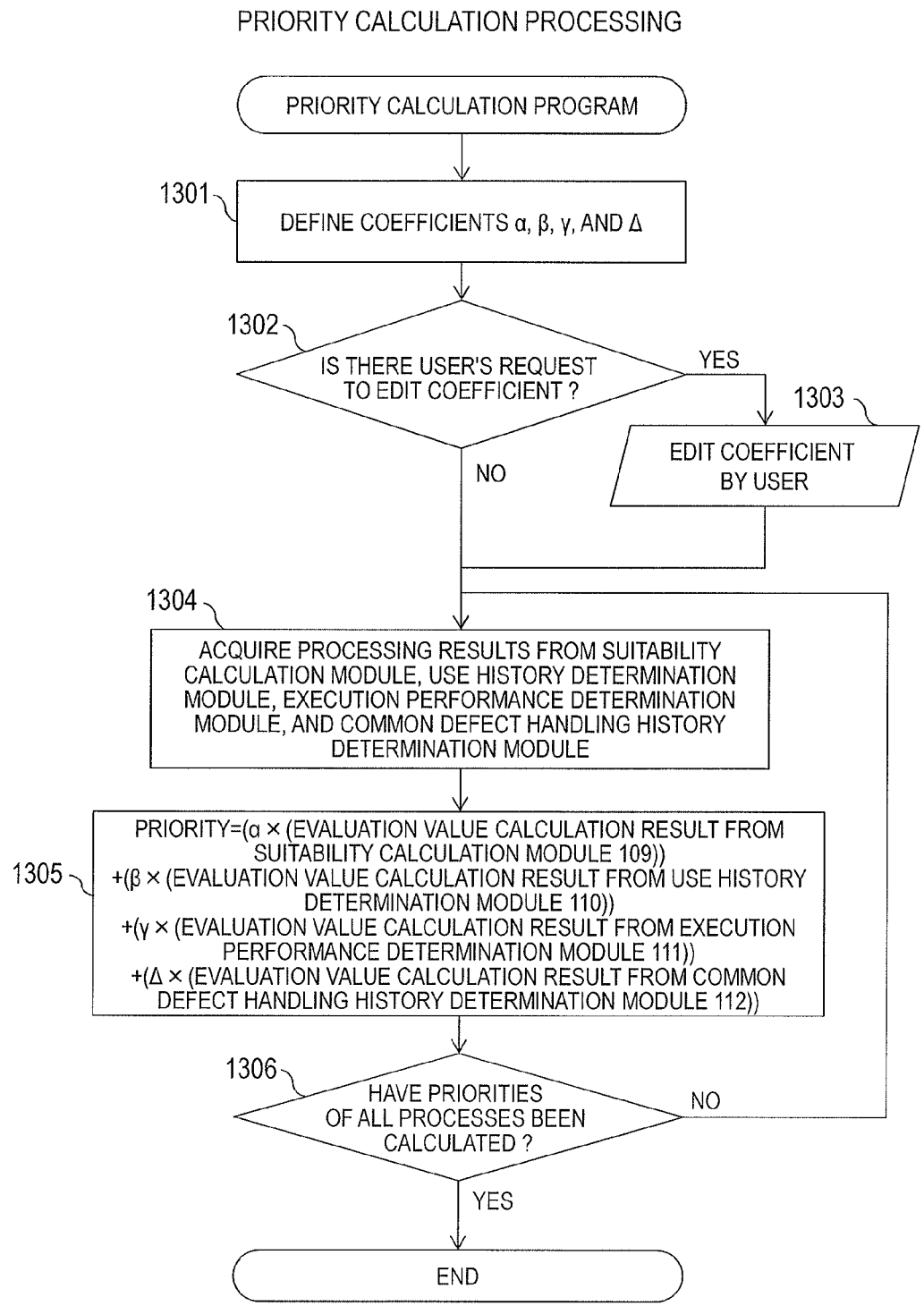
FIG. 13 is an example of a flowchart for illustrating a priority calculation processing executed by a priority calculation module of the management server according to the first embodiment of this invention.

FIG. 13 is an example of a flowchart for illustrating the priority calculation processing executed by the priority calculation module 113 of the management server 101 according to the first embodiment of this invention.

The priority calculation processing is activated concurrently with the end of the processing of all or some of the suitability calculation module 109, the use history determination module 110, the execution performance determination module 111, and the common defect handling history determination module 112. Alternatively, the activation of the priority calculation processing may be triggered by the failure in the execution of the process on the management target apparatus, by the configuration change of the management target apparatus, by the change in the process information 114, or by some tool or utility (not shown).

The priority calculation processing illustrated in FIG. 13 includes the processing of Step 1301 to Step 1306, but may further include the processing (not shown) other than those, or may not include some of those.

The priority calculation processing illustrated in FIG. 13 is described in detail.

First, the priority calculation module 113 defines coefficients α, β, γ, and Δ (Step 1301).

In addition, the priority calculation module 113 determines whether or not the user's request to edit a coefficient exists (Step 1302), and when the request exists, receives an edit result of the coefficient from the user (Step 1303).

Subsequently, the priority calculation module 113 acquires the results of the suitability calculation processing illustrated in FIG. 9 or the like, the use history determination processing illustrated in FIG. 10 or the like, the execution performance determination processing illustrated in FIG. 11 or the like, and the common defect handling history determination processing illustrated in FIG. 12 or the like (Step 1304).

Subsequently, the priority calculation module 113 calculates the priority by using the numerical values obtained by multiplying the coefficients $\alpha$, $\beta$, $\gamma$, and $\Delta$ defined in Step 1301 (edited in Step 1303 when Step 1303 is further executed) by the evaluation values calculated by the suitability calculation module 109, the use history determination module 110, the execution performance determination module 111, and the common defect handling history determination module 112, respectively (Step 1305).

The priority represents an index indicating a magnitude of the possibility that a process that can be used as the alternative process to the process that has failed to execute, that is, a process that can achieve an equivalent object to that of the process that has failed to execute and that has a possibility of not including the cause of the failure included in the process that has failed to execute, which is selected from among the processes held by the management server 101, can be used as the alternative process.

In the example of FIG. 13, the priority calculation module 113 calculates a final priority of the process by calculating a total sum of the numerical values obtained by multiplying the coefficients by the evaluation values respectively obtained from the suitability calculation module 109, the use history determination module 110, the execution performance determination module 111, and the common defect handling history determination module 112, but the final priority may be calculated by a method other than the above-mentioned method.

For example, the priority calculation module 113 may calculate the final priority by further multiplying the numerical values, which are obtained by multiplying the coefficients by the evaluation values respectively obtained from the suitability calculation module 109, the use history determination module 110, the execution performance determination module 111, and the common defect handling history determination module 112, by one another.

As the values of the coefficients defined in the processing illustrated in Step 1301 of FIG. 13, numerical values input and held in advance may be used, or numerical values calculated by some tool or utility (not shown) may be used.

For example, when it becomes clear empirically that a correlation between the magnitude of the probability that the similar process was successfully used as the alternative process to the failed process in actuality and the magnitude of the evaluation value of the similar process calculated by the suitability calculation module 109 is higher than a correlation between the magnitude of the probability that the similar process was successfully used as the alternative process to the failed process in actuality and the magnitude of the evaluation value of the similar process calculated by the use history determination module 110, it is possible to give a priority with higher accuracy by making the coefficient $\alpha$ to be multiplied by the evaluation value calculated by the suitability calculation module 109 larger than the coefficient $\beta$ to be multiplied by the evaluation value calculated by the use history determination module 110.

It should be noted that the priority calculation processing illustrated in FIG. 13 is merely an example of the processing for calculating the final priority by weighting the evaluation values respectively calculated in the suitability calculation processing, the use history determination processing, the execution performance determination processing, and the common defect handling history determination processing, and the coefficients $\alpha$, $\beta$, $\gamma$, and $\Delta$ correspond to weighting factors. However, the final priority may be calculated in processing other than the processing of FIG. 13.

For example, increments (or decrements) used when the evaluation values are determined to be raised (or lowered) respectively in the above-mentioned pieces of processing may be set as the values corresponding to (for example, in proportion to) the above-mentioned coefficients $\alpha$, $\beta$, $\gamma$, and $\Delta$. Specifically, for example, the processor 201 of the management server 101 may first initialize the evaluation values of all the processes and then execute the suitability calculation processing. At this time, the increments of the evaluation values for Step 903, Step 905, and Step 907 and the decrement of the evaluation value for Step 909 may be set as $\alpha$.

Subsequently, the processor 201 may execute the use history determination processing for the evaluation value calculated in the suitability calculation processing. At this time, the increment of the evaluation value in Step 1005 and the decrement of the evaluation value in Step 1007 may be set as $\beta$. In the same manner, the execution performance determination processing and the common defect handling history determination processing may be executed sequentially, and the increments (or decrements) of the evaluation values for those pieces of processing may be set as $\gamma$ and $\Delta$, respectively. When the evaluation value is thus calculated, the evaluation value obtained finally becomes the above-mentioned final priority, which eliminates the need to execute the priority calculation processing illustrated in FIG. 13.

FIG. 14 is an example of a flowchart for illustrating the similar process retrieval processing executed by the management server 101 according to the first embodiment of this invention.

The similar process retrieval processing is activated in response to the instruction issued by, for example, the user of the information processing system such as the operation administrator through the input apparatus 122 or the input apparatus 203. Alternatively, the similar process retrieval processing may be activated by the suitability calculation module 109, the use history determination module 110, the execution performance determination module 111, the common defect handling history determination module 112, or the priority calculation module 113, or may be activated by some tool or utility (not shown). Specifically, for example, the similar process retrieval processing is activated in Step 901 of the suitability calculation processing.

The similar process retrieval processing includes the processing of Step 1401 to Step 1406, but may further include the processing (not shown) other than those, or may not include some of those.

The similar process retrieval processing has an object to retrieve the process high in similarity to the specified process, and therefore, when the process high in similarity can be retrieved by processing other than the processing illustrated in FIG. 14, may conduct the above-mentioned processing instead of the processing illustrated in FIG. 14.

For example, when the process identifier includes information indicating the similarity between processes, the process high in similarity may be retrieved based on the information. Specifically, for example, when the process identifier of a certain process includes a process name such as "Process X" and a version number such as "v1.0.0" as shown in FIG. 3, and when one process and a process obtained by partially changing the one process (for example, so as to be executable under another execution environment) are given the same process name and different version numbers, the process having the same process name as that of the specified process and a version number different from that of the specified process can be retrieved as the process similar to the specified process.

As described above, the process high in similarity typically represents an original process or a plurality of derivative processes including the specified process such as managed by, for example, the version number. However, in this embodiment, the process determined to be high in similarity in the processing described below, even when the process does not meet the above-mentioned condition, is handled as the process high in similarity (that is, derivative process).

The similar process retrieval processing exemplified in FIG. 14 is described in detail. The similar process retrieval processing is described below as processing to be executed by a similar process retrieval module (not shown). The similar process retrieval module is realized by the processor 201 executing any one of the programs (for example, similar process retrieval program (not shown)) included in the various programs 120.

When receiving information for specifying a process to be subjected to the similar process retrieval processing as an input, the similar process retrieval module refers to the process constituent 302 of the process information 114 to acquire the number of process constituents of the process supplied as the input (number of part contents included in the process supplied as the input) (Step 1401).

Subsequently, the similar process retrieval module refers to the process constituent 302 to acquire the number of process constituents of an arbitrary process (Step 1402).

Subsequently, the similar process retrieval module compares the process constituents acquired in Step 1401 with the process constituents acquired in Step 1402, and calculates the number of process constituents that are included in both thereof (that is, number of matched process constituents) (Step 1403).

For example, when the part content having the same identifier as that of one part content included in the process constituents acquired in Step 1401 is included in the process constituents acquired in Step 1402, the similar process retrieval module increases the number of matched process constituents by 1. In the same manner, in regard to all the part contents included in the process constituents acquired in Step 1401, the similar process retrieval module determines whether or not the part content having the same identifier as that of each of the part contents is included in the process constituents acquired in Step 1402, and calculates the number of part contents determined to be included as the number of matched process constituents.

At this time, the similar process retrieval module may allow a partial match of the part content. For example, when the identifier of the part content includes a part content name and a version number, and when the part content having the same part content name as that of one part content included in the process constituents acquired in Step 1401 and a version number different from that of the one part content is included in the process constituents acquired in Step 1402, the similar process retrieval module may increase the number of matched process constituents by 0.5.

Subsequently, the similar process retrieval module calculates a ratio of the number of matched constituents calculated in Step 1403 to the number of constituents of the process supplied as the input, as a similarity between the process supplied as the input and the above-mentioned arbitrary process (Step 1404).

Subsequently, the similar process retrieval module determines whether or not the similarity calculated in Step 1404 exceeds a predetermined threshold value (Step 1405).

When the similarity calculated in Step 1404 exceeds the predetermined threshold value, the similar process retrieval module outputs the above-mentioned arbitrary process as the process similar to the process supplied as the input (Step 1406). On the other hand, when the similarity calculated in Step 1404 does not exceed the predetermined threshold value, the similar process retrieval module executes the processing of Step 1402 and the subsequent steps for another arbitrary process without executing Step 1406.

At this time, the similar process retrieval module may calculate the similarity, or determine whether or not the similarity exceeds the threshold value, based on different conditions between the process constituents. For example, even when the similarity calculated in Step 1404 exceeds the threshold value, and when the part content at a head of the process supplied as the input (that is, to be executed at first) does not perfectly match (that is, is a content completely different from, or partially matches) the part content at the head of the process serving as a comparison target, the similar process retrieval module may return to Step 1402 without executing Step 1406.

FIG. 15 is an example of a flowchart for illustrating the similar execution environment retrieval processing executed by the management server 101 according to the first embodiment of this invention.

The similar execution environment retrieval processing is activated in response to the instruction issued by, for example, the user of the information processing system such as the operation administrator through the input apparatus 122 or the input apparatus 203. Alternatively, the similar execution environment retrieval processing may be activated by the suitability calculation module 109, the use history determination module 110, the execution performance determination module 111, the common defect handling history determination module 112, or the priority calculation module 113, or may be activated by some tool or utility (not shown). Specifically, for example, the similar execution environment retrieval processing is activated in Step 1002 of the use history determination processing and Step 1102 of the execution performance determination processing.

The similar execution environment retrieval processing includes the processing of Step 1501 to Step 1504, but may further include the processing (not shown) other than those, or may not include some of those.

The similar execution environment retrieval processing has an object to retrieve an apparatus that has or had configuration information high in similarity and a period corresponding thereto, and therefore, when such an apparatus and a period can be retrieved by processing other than the processing illustrated in FIG. 15, may conduct the above-mentioned processing instead of the processing illustrated in FIG. 15.

For example, when a combination of pieces of configuration information is managed by tagging, and when similar pieces of configuration information can be managed by a combination tag, the operation target apparatus having similar configuration information and the period similar in the configuration information may be retrieved by using the combination tag.

The similar execution environment retrieval processing exemplified in FIG. 15 is described in detail. The similar execution environment retrieval processing is described below as processing to be executed by a similar execution environment retrieval module (not shown). The similar execution environment retrieval module is realized by the processor 201 executing any one of the programs (for example, similar execution environment retrieval program (not shown)) included in the various programs 120.

The similar execution environment retrieval module receives the configuration information on a processing target apparatus at a processing target date/time as an input, and uses the system configuration information 115 to acquire the configuration information on an arbitrary management target apparatus (hereinafter referred to as "comparison target apparatus" in the description made with reference to FIG. 15) during an arbitrary period (hereinafter referred to as "comparison target period" in the description made with reference to FIG. 15) (Step 1501). For example, when the similar execution environment retrieval processing is activated in Step 1002 of the use history determination processing, the similar execution environment retrieval module receives the apparatus and the date/time that are acquired in Step 1001 as the input for the similar execution environment retrieval processing. When the similar execution environment retrieval processing is activated in Step 1102 of the execution performance determination processing, the similar execution environment retrieval module receives the apparatus and the date/time that are acquired in Step 1101 as the input for the similar execution environment retrieval processing.

Subsequently, the similar execution environment retrieval module compares the configuration information on the apparatus supplied as the input at the date/time supplied as the input with the configuration information on the comparison target apparatus during the comparison target period, which is acquired in Step 1501, and calculates the similarity therebetween based on the number of constituents included in both thereof (that is, number of matched constituents) (Step 1502).

For example, when the constituent having the same identifier as that of one constituent of the apparatus supplied as the input at the date/time supplied as the input based on the identifier of the constituent registered as the component 402 of the system configuration information 115 is included in the constituents of the comparison target apparatus during the comparison target period, the similar execution environment retrieval module increases the number of matched constituents by 1. In the same manner, in regard to all the constituents of the apparatus supplied as the input at the date/time supplied as the input, the similar execution environment retrieval module determines whether or not the constituent having the same identifier as that of each of the constituents is included in the constituents of the comparison target apparatus during the comparison target period, and calculates the number of constituents determined to be included as the number of matched constituents.

At this time, the similar execution environment retrieval module may allow a partial match of the constituent. For example, when the identifier of the constituent of the software includes a software name and a version number, and when the constituent having the same software name as that of one constituent of the apparatus supplied as the input at the date/time supplied as the input and a version number different from that of the one constituent is included in the constituents of the comparison target apparatus, the similar execution environment retrieval module may increase the number of matched constituents by 0.5.

Then, the similar execution environment retrieval module calculates, as the similarity, a ratio of the number of matched constituents of the comparison target apparatus to the number of elements of the configuration information on the operation target apparatus supplied as the input at the time point supplied as the input.

Subsequently, the similar execution environment retrieval module determines whether or not the calculated similarity exceeds a predetermined threshold value (Step 1503).

When the similarity calculated in Step 1503 exceeds the predetermined threshold value, the similar execution environment retrieval module outputs the comparison target apparatus and the comparison target period (Step 1504). On the other hand, when the similarity calculated in Step 1503 does not exceed the predetermined threshold value, the similar execution environment retrieval module executes the processing of Step 1502 and the subsequent steps for the above-mentioned comparison target apparatus during another comparison target period or for another comparison target apparatus during an arbitrary comparison target period, without executing Step 1504.

By the above-mentioned processing, the management target apparatus, which had a configuration similar to the configuration under a process execution environment of the operation target apparatus supplied as the input at the date/time supplied as the input, and the period, during which the management target apparatus had the configuration similar to the configuration under the process execution environment of the operation target apparatus supplied as the input at the date/time supplied as the input, are retrieved.

It should be noted that, when the system configuration information 115 includes information indicating which of hardware and software the registered constituent (component) is, in Step 1502, the similar execution environment retrieval module may classify and calculate the similarity regarding the constituents of the software and the similarity regarding the constituents of the hardware. In this case, in Step 1503, the similar execution environment retrieval module may compare, for example, the similarity regarding the constituent of the software and the similarity regarding the constituent of the hardware respectively with different threshold values.

Further, when the system configuration information 115 includes information indicating a kind of registered constituent (for example, information indicating whether or not the constituent is an OS), in Step 1502, the similar execution environment retrieval module may calculate the similarity based on conditions different depending on the kind of constituent. For example, when the constituent to be compared is an OS, the similar execution environment retrieval module may increase the similarity only in a case of a perfect match.

The processing of Step 1504 illustrated in FIG. 15 is represented so that only the similar apparatus name and the similar period are output, but data (not shown) other than those may be further output, or some of those may not be output. Examples of the data (not shown) to be output include information indicating whether or not a specific constituent is matched, and an item regarding the configuration information on the matching, and an item regarding the configuration information on the non-matching.

According to the above-mentioned similar execution environment retrieval processing, it is possible to avoid an erroneous evaluation of the process based on the use history and the execution performance under different execution environments and to conduct the evaluation with higher accuracy.

Now, effects of the similar execution environment retrieval processing are described by using management target apparatus S1 to S4 each serving as any one of a plurality of server apparatus 103 and OS1 to OS3 serving as OSes that run on those management target apparatus. For example, it is assumed that, on the management target apparatus S1 using OS1, the process "A, B, C" was used and the execution of Part Content C has failed. In this case, OS1 is registered in the system configuration information 115 as the constituent of the software of the management target apparatus S1.

In this example, when the process "A, B, C" is registered as the succeeding process of the process "A, B, C" used by the management target apparatus S2 on which OS1 runs, the process "A, B, C'''" is registered as the succeeding process of the process "A, B, C" used by the management target apparatus S3 on which OS2 runs, and the process "A, B, C''''" is registered as the succeeding process of the process "A, B, C" used by the management target apparatus S4 on which OS3 runs, there is a possibility that the process "A, B, C" can be used as the succeeding process of the process "A, B, C" on the management target apparatus S1. However, it is highly possible that the process "A, B, C'''" and the process "A, B, C''''" are compatible with OS2 and OS3, respectively, and therefore, the possibility that the process "A, B, C'''" and the process "A, B, C''''" can be used as the succeeding process of the process "A, B, C" on the management target apparatus S1 on which OS1 runs is low. The same applies to the case where the execution success probabilities of the processes "A, B, C", "A, B, C", and "A, B, C'''" are all sufficiently high. As in the second embodiment described later, the process high in possibility that the cause of the failure has been solved can be suggested without execution of the similar execution environment retrieval processing, but by executing the similar execution environment retrieval processing, it is possible to suggest the process high in possibility that the cause of the failure has been solved with higher accuracy.

As described above, according to the first embodiment of this invention, when there is a process content that has failed to execute, it is possible to suggest each process content on an evaluation-value basis by calculating the evaluation values of an original process content or a plurality of derivative process contents of the process content that has failed based on presence/absence of a change in a portion corresponding to the problem portion of the process content that has failed or the data source portion of the problem portion.

According to the related art disclosed in, for example, JP 2007-128450 A, it is possible to select the part forming the process content compatible with the problem portion of a predetermined process content, but when there is a process content in which the problem portion has been changed to the portion compatible therewith (hereinafter referred to as "compatible process content") among the original process content or the plurality of derivative process contents of the predetermined process content, it is not possible to present the compatible process content to the user. In contrast, according to the first embodiment of this invention, as described above, it is possible to present the compatible process content to the user. Therefore, it is possible to reduce a time for selecting the process content in which the problem portion has been changed to another compatible part.

The management system manages a plurality of computer systems, and the same original process content can be used to manage the plurality of computer systems. Therefore, when the use period of the management system is sufficiently long, the derivative process contents corresponding to the imperfection in a plurality of system configurations have been cumulated. As a result, when the execution of the process content fails on any one of the management target apparatus, there is a possibility that the process content in which the cause of the failure has already been solved is included in the cumulated derivative process contents.

According to the first embodiment of this invention, it is possible to suggest a process with which a problem is highly likely to have been solved in a short time without requiring the user's time and labor, and the user can preferentially use the process with which the problem is highly likely to have been solved.

<Second Embodiment>

Now, the second embodiment of this invention is described with reference to the accompanying drawings. Except for different points described below, respective components of the information processing system according to the second embodiment have the same functions as the respective components denoted by the same reference symbols according to the first embodiment illustrated in FIG. 1 and the like, and hence descriptions thereof are omitted. Specifically, an example of a configuration of the information processing system according to the second embodiment is the same as that of the information processing system according to the first embodiment illustrated in FIG. 1 except for different points in the management server 101 described later. Examples of the process information 114, the use history 116, and the execution performance 117 according to the second embodiment are as described with reference to FIG. 3, FIG. 5, and FIG. 6, respectively. An example of a procedure for suggestion processing according to the second embodiment is as described with reference to FIG. 7, FIG. 9, FIG. 13, and FIG. 14 except for different points in Step 702 to Step 704 described later. Examples of the information to be output according to the second embodiment are as described with reference to FIG. 8A and FIG. 8B.

Figure 16:
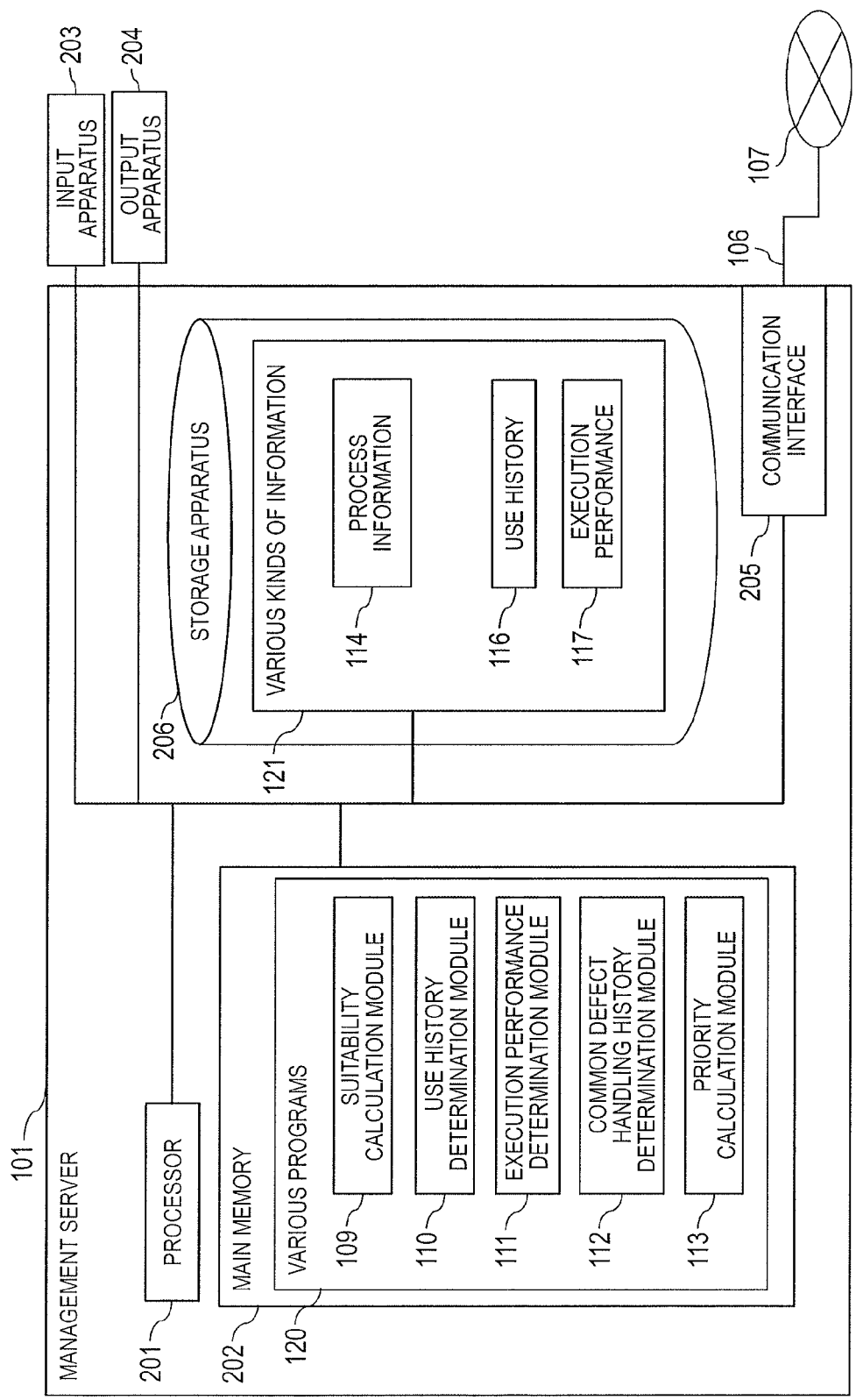
FIG. 16 is an example of a block diagram for illustrating a configuration of a management server according to a second embodiment of this invention.

FIG. 16 is an example of a block diagram for illustrating a configuration of the management server 101 according to the second embodiment of this invention.

Figure 17:
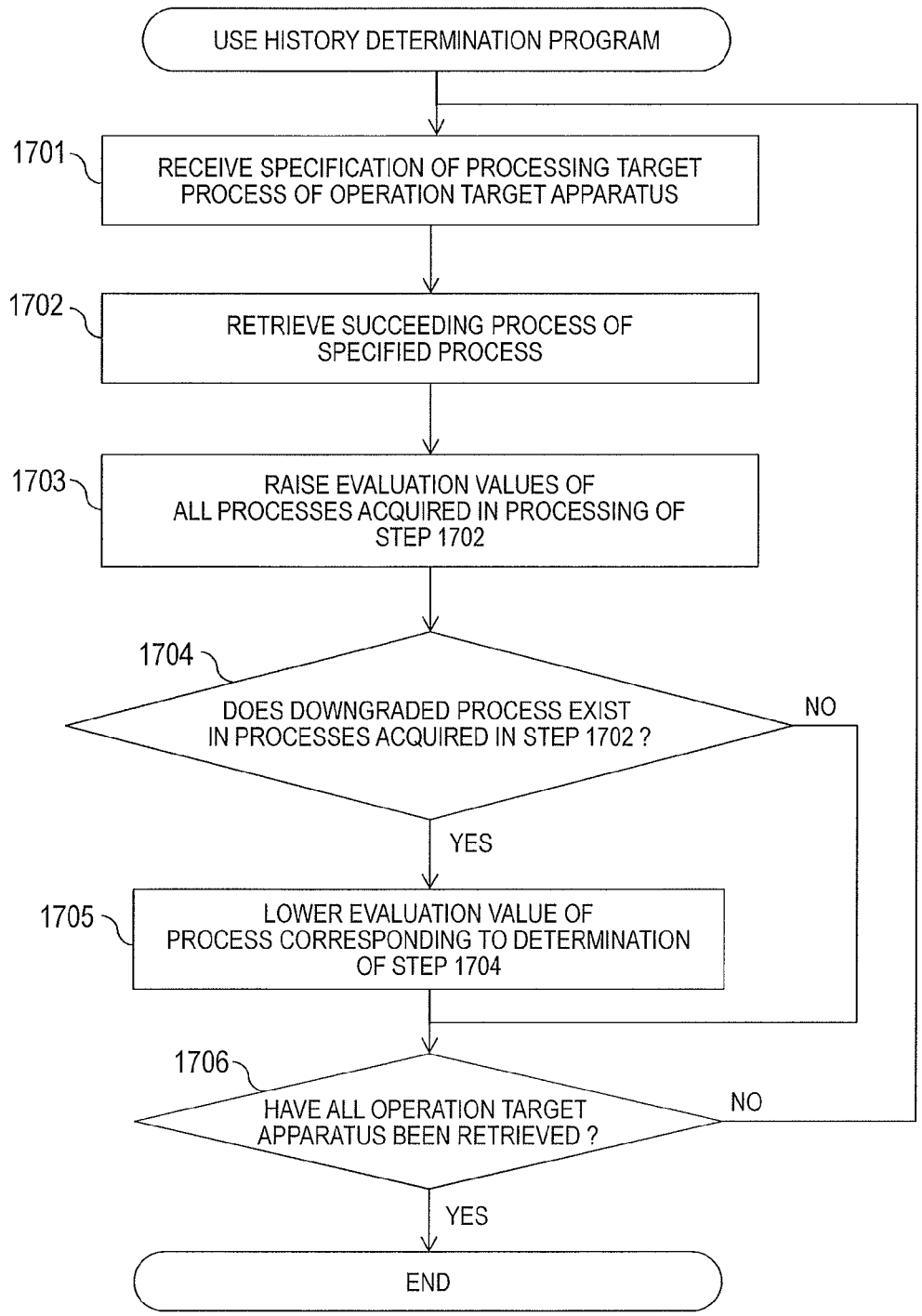
FIG. 17 is an example of a flowchart for illustrating a use history determination processing executed by a use history determination module of the management server according to the second embodiment of this invention.
Figure 18:
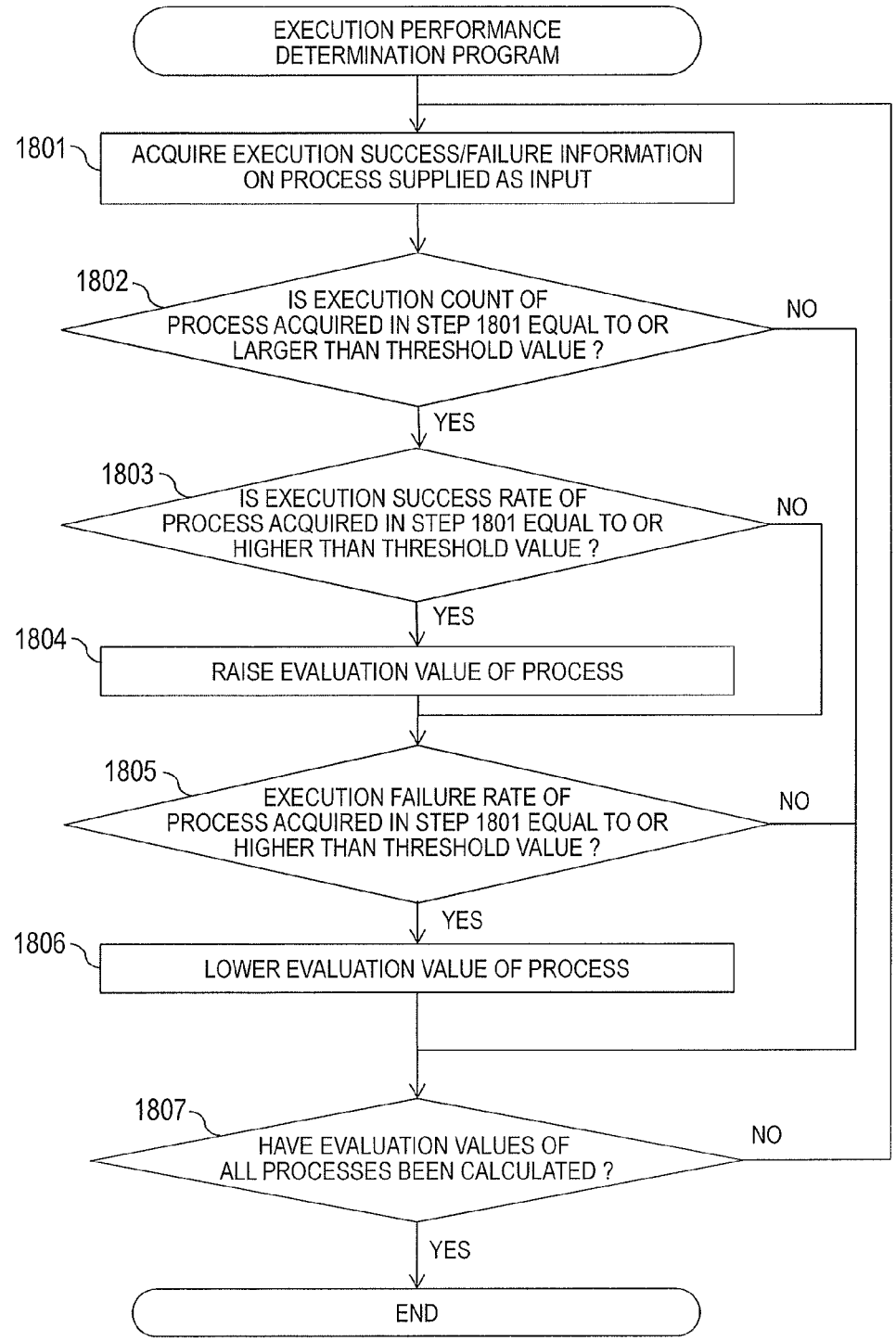
FIG. 18 is an example of a flowchart for illustrating an execution performance determination processing executed by an execution performance determination module of the management server according to the second embodiment of this invention.
Figure 19:
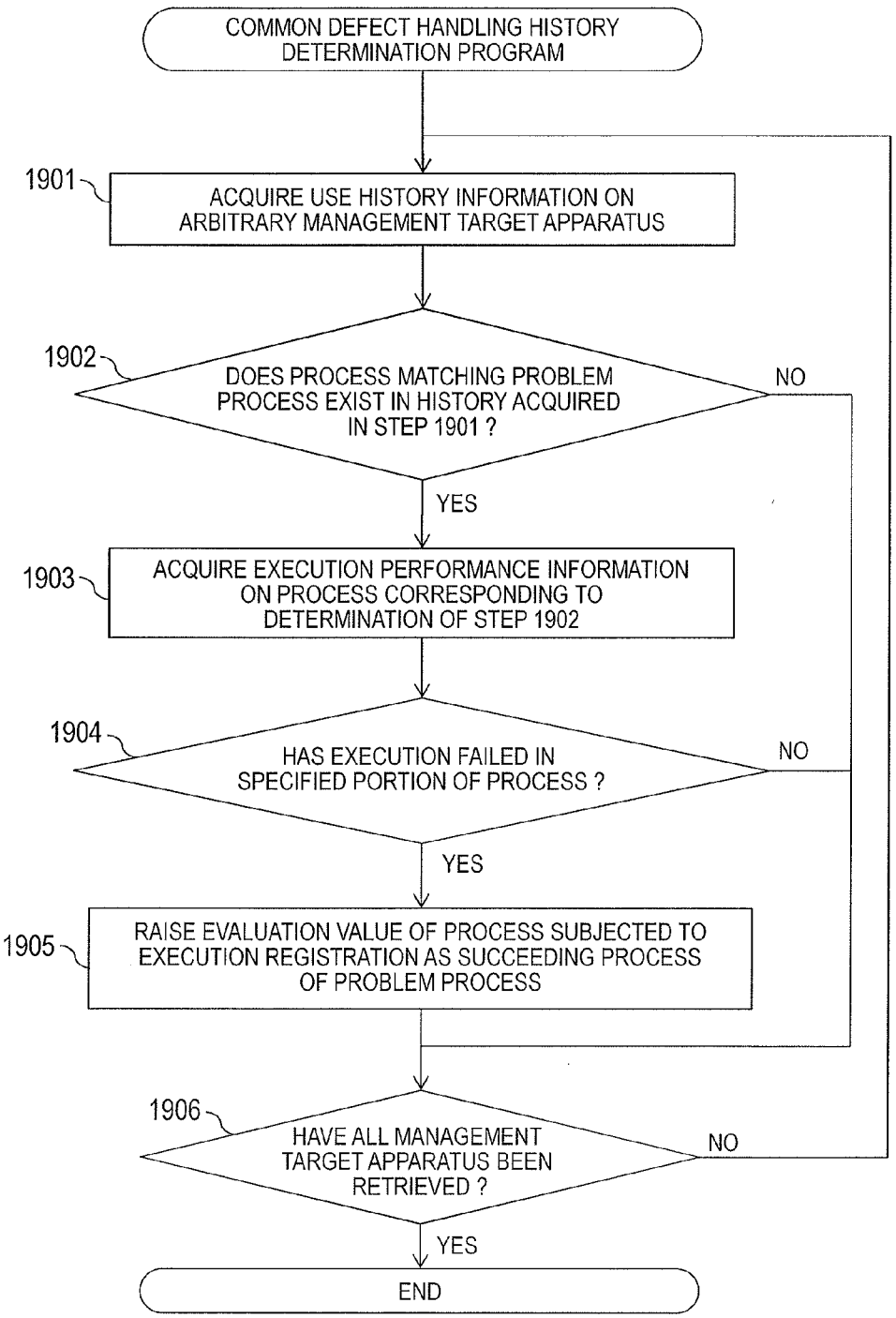
FIG. 19 is an example of a flowchart for illustrating a common defect handling history determination processing executed by a common defect handling history determination module of the management server according to the second embodiment of this invention.

The management server 101 according to the second embodiment is the same as the management server 101 according to the first embodiment illustrated in FIG. 2 except that the various kinds of information 121 does not need to include the system configuration information 115 and that the use history determination program 110, the execution performance determination program 111, and the common defect handling history determination module 112 execute the processing without using the system configuration information 115 as illustrated in FIG. 17 to FIG. 19, and hence descriptions relating to points other than the above-mentioned different points are omitted.

FIG. 17 is an example of a flowchart for illustrating the use history determination processing executed by the use history determination module 110 of the management server 101 according to the second embodiment of this invention.

The use history determination processing according to the second embodiment is processing to be executed in Step 702 of FIG. 7, and is activated in the same manner as the use history determination processing according to the first embodiment illustrated in FIG. 10.

The use history determination processing illustrated in FIG. 17 includes the processing of Step 1701 to Step 1706, but may further include the processing (not shown) other than those, or may not include some of those.

The use history determination processing illustrated in FIG. 17 is described in detail.

First, the use history determination module 110 receives the information for specifying a processing target process as an input (Step 1701).

Subsequently, the use history determination module 110 uses the use history 116 to acquire all processes used as the succeeding process of the process supplied as the input from the use history of the process supplied as the input (Step 1702), and raises the evaluation values of the acquired processes (Step 1703).

Subsequently, the use history determination module 110 determines whether or not a downgraded process, that is, a process used between the use histories of the processes having the same process identifier exists among the processes whose evaluation values have been raised (Step 1704), and when the downgraded process exists, lowers the evaluation value of the process (Step 1705). Subsequently, the use history determination module 110 determines whether or not the above-mentioned processing has been finished for all the operation target apparatus (Step 1706), and when the processing has not been finished, the processing returns to Step 1701 to execute the processing of Step 1701 and the subsequent steps relating to the remaining operation target apparatus.

When the above-mentioned processing has been finished for all the operation target apparatus, the calculation of the evaluation value of the process conducted in the use history determination processing is brought to an end.

FIG. 18 is an example of a flowchart for illustrating the execution performance determination processing executed by the execution performance determination module 111 of the management server 101 according to the second embodiment of this invention.

The execution performance determination processing according to the second embodiment is processing to be executed in Step 703 of FIG. 7, and is activated in the same manner as the execution performance determination processing according to the first embodiment illustrated in FIG. 11.

The execution performance determination processing illustrated in FIG. 18 includes the processing of Step 1801 to Step 1807, but may further include the processing (not shown) other than those, or may not include some of those. Further, Step 1803 and Step 1804 may be executed after Step 1805 and Step 1806.

The execution performance determination processing illustrated in FIG. 18 is described in detail.

First, the execution performance determination module 111 uses the execution performance 117 to acquire the value of the execution success/failure 604 of the process supplied as the input (Step 1801).

Subsequently, the execution performance determination module 111 determines whether or not the execution count of the process acquired in Step 1801 is equal to or larger than a predetermined threshold value (Step 1802).

When the execution count of the process acquired in Step 1801 is equal to or larger than a fixed threshold value, the execution performance determination module 111 determines whether or not an execution success rate of the process acquired in Step 1801 is equal to or larger than a predetermined threshold value (Step 1803), and when the execution success rate is equal to or higher than the predetermined threshold value, raises the evaluation value of the process acquired in Step 1801 (Step 1804).

Subsequently, the execution performance determination module 111 determines whether or not an execution failure rate of the process acquired in Step 1801 is equal to or larger than a predetermined threshold value (Step 1805), and when the execution failure rate is equal to or higher than the predetermined threshold value, lowers the evaluation value of the process acquired in Step 1801 (Step 1806).

Subsequently, the execution performance determination module 111 determines whether or not the calculation of the evaluation values of all the processes has been finished (Step 1807), and when the calculation has not been finished, the processing returns to Step 1801 to execute the processing of Step 1801 and the subsequent steps relating to the remaining processes. When the calculation of the evaluation values of all the processes have been finished, the calculation of the evaluation value of the process conducted in the execution performance determination processing is brought to an end.

It should be noted that, when determining in Step 1802 that the execution count of the process is smaller than the predetermined threshold value, the execution performance determination module 111 executes Step 1807 without executing any one of Step 1803 to Step 1806. When determining in Step 1803 that the execution success rate of the process is smaller than the predetermined threshold value, the execution performance determination module 111 executes Step 1805 without executing Step 1804. When determining in Step 1805 that the execution failure rate of the process is smaller than the predetermined threshold value, the execution performance determination module 111 executes Step 1807 without executing Step 1806.

FIG. 19 is an example of a flowchart for illustrating the common defect handling history determination processing executed by the common defect handling history determination module 112 of the management server 101 according to the second embodiment of this invention.

The common defect handling history determination processing according to the second embodiment is processing to be executed in Step 704 of FIG. 7, and is activated in the same manner as the common defect handling history determination processing according to the first embodiment illustrated in FIG. 10.

The common defect handling history determination processing illustrated in FIG. 19 includes the processing of Step 1901 to Step 1906, but may further include the processing (not shown) other than those, or may not include some of those.

The common defect handling history determination processing illustrated in FIG. 19 is described in detail.

First, when receiving information for specifying the processing target process and the failed portion of the process as an input, the common defect handling history determination module 112 refers to the use history 116 to acquire the use history information on an arbitrary management target apparatus (Step 1901).

Subsequently, the common defect handling history determination module 112 determines whether or not the history of the process matching the process supplied as the input is included in the use history acquired in Step 1901 (Step 1902).

When the history of the process matching the process supplied as the input is included in the use history acquired in Step 1901, the common defect handling history determination module 112 refers to the execution performance 117 to acquire the execution performance information on the process matching the process supplied as the input (Step 1903).

Subsequently, the common defect handling history determination module 112 determines whether or not the failed location 605 matching the specified portion supplied as the input is included in the execution performance information acquired in Step 1903 (Step 1904).

When the failed location 605 matching the specified portion supplied as the input is included in the execution performance information acquired in Step 1903, the common defect handling history determination module 112 raises the evaluation value of the process subjected to the execution registration as the succeeding process of the process matching the process supplied as the input (Step 1905).

Subsequently, the common defect handling history determination module 112 determines whether or not the processing of Step 1902 and the subsequent steps has been finished for all the management target apparatus (Step 1906), and when the processing has not been finished, the processing returns to Step 1901 to acquire the use history information on the remaining management target apparatus and execute the processing of Step 1902 and the subsequent steps. When the retrieval of all the management target apparatus has been finished, the calculation of the evaluation value of the process conducted in the common defect handling history determination processing is brought to an end.

When determining in Step 1902 that the history of the process matching the process supplied as the input is not included, the common defect handling history determination module 112 executes Step 1906 without executing any one of Step 1903 to Step 1905. When determining in Step 1904 that the failed location 605 matching the portion supplied as the input is not included, the common defect handling history determination module 112 executes Step 1906 without executing Step 1905.

According to the second embodiment of this invention described above, for example, even when the management server 101 does not have a function of collecting and managing the configuration information on the respective management target apparatus, it is possible to suggest a process with which a problem is highly likely to have been solved in a short time without requiring the user's time and labor, and the user can preferentially use the process with which the problem is highly likely to have been solved.

The information including the programs, the tables, and the files for realizing the respective functions of the embodiments described above can be stored in a storage device such as a non-volatile semiconductor memory, a hard disk drive, or a solid state drive (SSD) or in a computer-readable non-transitory data storage medium such as an IC card, an SD card, or a DVD.

This invention is not limited to the embodiments described above and covers various modification examples other than the above-mentioned modification example. For instance, the embodiments described above are detailed descriptions written for an easy understanding of this invention, and this invention is not necessarily limited to a configuration that includes all of the described components. The configuration of one embodiment may partially be replaced by the configuration of another embodiment. The configuration of one embodiment may be joined by the configuration of another embodiment. In each embodiment, a part of the configuration of the embodiment may have another configuration added thereto or removed therefrom, or may be replaced by another configuration.

What is claimed is:

1. A management system configured to manage a plurality of management target systems, the management system comprising:
  a processor for executing a management program; and
  a storage resource communicatively coupled to the processor,
  wherein the storage resource stores:
  a plurality of process contents for executing operation management of the plurality of management target systems, and
  use history information that indicates which of the plurality of process contents is used after each of the plurality of process contents;
  wherein the plurality of process contents comprising:
  identifiers of a plurality of part contents included in each of the plurality of process contents; and
  information indicating a dependence relationship between the plurality of part contents,
  wherein the processor is configured to:
  retrieve, when information for specifying a first process content that has been executed among the plurality of process contents and information for specifying one of the plurality of part contents that has failed to execute as a problem portion among the plurality of part contents included in the first process content are input, one of the plurality of process contents similar to the first process content from the plurality of process contents stored in the storage resource;
  increase an evaluation value of the retrieved one of the plurality of process contents when one of the plurality of part contents corresponding to the problem portion among the plurality of part contents included in the retrieved one of the plurality of process contents is different from the one of the plurality of part contents specified as the problem portion;
  increase the evaluation value of the retrieved one of the plurality of process contents when one of the plurality of part contents corresponding to a data source portion of the problem portion, which is identified based on the dependence relationship between the plurality of part contents among the plurality of part contents included in the retrieved one of the plurality of process contents, is different from one of the plurality of part contents of the data source portion of the problem portion of the first process content;
  decrease the evaluation value of the retrieved one of the plurality of process contents when one of the plurality of part contents corresponding to a first portion other than any one of the problem portion and the data source portion of the problem portion among the plurality of part contents included in the retrieved one of the plurality of process contents is different from one of the plurality of part contents of the first portion of the first process content;
  increase the evaluation value of one of the plurality of process contents used after the first process content in any one of the plurality of management target systems based on the use history information; and
  output information relating to the plurality of process contents based on the evaluation value calculated for each of the plurality of process contents.

2. The management system according to claim 1, wherein:
  the storage resource further stores execution performance information that includes execution results and execution times for each of the plurality of process contents in the plurality of management target systems; and
  the processor is further configured to:
  increase the evaluation value of one of the plurality of process contents having an execution success probability, which is calculated based on the execution performance information, exceeding a predetermined threshold value.

3. The management system according to claim 2, wherein:
  the execution performance information further includes input information indicating one of the plurality of part contents that has failed to execute and an input failure cause of execution when a particular execution result of the plurality of process contents has failed; and the processor is further configured to:

increases, based on the use history information and the execution performance information, when the first process content is executed in a first management target system included in the plurality of management target systems, and when one of the plurality of part contents of the problem portion fails to execute due to a same cause as the input failure cause, the evaluation value of the one of the plurality of process contents used after the first process content in the first management target system.

4. The management system according to claim 3, wherein:

the storage resource further stores configuration information indicating a type of constituent of each of the plurality of management target systems during a period until a present time;

the input information further comprises information for identifying a second management target system that has executed the first process content among the plurality of management target systems and information indicating a timing at which the first process content was executed;

the processor is configured to:

retrieve, based on the configuration information, from the plurality of management target systems, at least one of the plurality of management target systems, which had a configuration similar to a configuration of the second management target system at the timing at which the first process content was executed, and a period, during which the at least one of the plurality of management target systems had the configuration similar to the configuration of the second management target system at the timing at which the first process content was executed;

increase the evaluation value of the one of the plurality of process contents used after the first process content based on the use history information relating to the retrieved at least one of the plurality of management target systems during the retrieved period; and calculate the execution success probability and an execution failure probability based on the execution performance information relating to the retrieved at least one of the plurality of management target systems during the retrieved period; and the first management target system comprises any one of the retrieved at least one of the plurality of management target systems.

5. The management system according to claim 4, wherein:

the information indicating the dependence relationship between the plurality of part contents comprises data to be input to each of the plurality of part contents included in each of the plurality of process contents, data to be output from each of the plurality of part contents, and information for identifying an operation target of each of the plurality of part contents; and the processor identifies, as one of the plurality of part contents of the data source portion of the problem portion, one of: one of the plurality of part contents configured to output the data to be input to one of the plurality of part contents of the problem portion; and one of the plurality of part contents comprising a same operation target as a particular operation target of one of the plurality of part contents of the problem portion.

6. The management system according to claim 5, wherein the processor decreases, based on the use history information, when a second process content that is one of the plurality of process contents was used for a first time after the first process content in any one of the plurality of management target systems, when at least one of the plurality of process contents other than the second process content was used later, and when the second process content was used further later for a second time, the evaluation value of the at least one of the plurality of process contents, which was used between the first time that the second process content was used and the second time that the second process content was used.

7. The management system according to claim 6, wherein the processor is further configured to preferentially output information for identifying one of the plurality of process contents having the evaluation value calculated to be high, and further outputs information indicating a reason that the evaluation value has been increased.

8. A non-transitory computer-readable medium having instructions recorded thereon that, if executed by a processor of a management system, cause the processor to perform a method comprising:

retrieving, when information for specifying a first process content that has been executed among a plurality of process contents and information for specifying one of a plurality of part contents that has failed to execute as a problem portion among the plurality of part contents included in the first process content are input, one of the plurality of process contents similar to the first process content from the plurality of process contents stored in a storage resource communicatively coupled to the processor;

increasing an evaluation value of the retrieved one of the plurality of process contents when one of the plurality of part contents corresponding to the problem portion among the plurality of part contents included in the retrieved one of the plurality of process contents is different from the one of the plurality of part contents specified as the problem portion;

increasing the evaluation value of the retrieved one of the plurality of process contents when one of the plurality of part contents corresponding to a data source portion of the problem portion, which is identified based on a dependence relationship between the plurality of part contents among the plurality of part contents included in the retrieved one of the plurality of process contents, is different from one of the plurality of part contents of the data source portion of the problem portion of the first process content;

decreasing the evaluation value of the retrieved one of the plurality of process contents when one of the plurality of part contents corresponding to a first portion other than any one of the problem portion and the data source portion of the problem portion among the plurality of part contents included in the retrieved one of the plurality of process contents is different from one of the plurality of part contents of the first portion of the first process content;

increasing the evaluation value of one of the plurality of process contents used after the first process content based on use history information stored in the storage resource, wherein the use history information includes use history information that indicates which of the plurality of process contents is used after each of the plurality of process contents; and outputting information relating to the plurality of process contents based on the evaluation value calculated for each of the plurality of process contents.

9. The non-transitory computer-readable medium according to claim 8, wherein:
the storage resource further stores execution performance information indicating execution results and executions times of each of the plurality of process systems corresponding to a plurality of times; and
the non-transitory computer-readable medium further controls the processor to execute:
increasing the evaluation value of one of the plurality of process contents having an execution success probability, which is calculated based on the execution performance information, exceeding a predetermined threshold value.

10. The non-transitory computer-readable medium according to claim 9, wherein:
the execution performance information further includes input information indicating one of the plurality of part contents that has failed to execute and an input failure cause of execution when a particular execution result of the plurality of process contents has failed; and
the non-transitory computer-readable medium further controls the processor to execute a ninth step of increasing, based on the use history information and the execution performance information, when the first process content is executed in a first management target system included in a plurality of management target systems, and when one of the plurality of part contents of the problem portion fails to execute due to a same cause as the input failure cause, the evaluation value of the one of the plurality of process contents used after the first process content in the first management target system.

11. The non-transitory computer-readable medium according to claim 10, wherein:
the storage resource further stores configuration information indicating a type of constituent of each of the plurality of management target systems during a period until a present time;
the input information further comprises information for identifying a second management target system that has executed the first process content among the plurality of management target systems and information indicating a timing at which the first process content was executed;
the non-transitory computer-readable medium further controls the processor to execute a tenth step of retrieving, based on the configuration information, from the plurality of management target systems, at least one of the plurality of management target systems, which was similar to the second management target system at the timing at which the first process content was executed, and a period, during which the at least one of the plurality of management target systems had a configuration similar to a configuration of the second management target system at the timing at which the first process content was executed;
increasing the evaluation value of the one of the plurality of process contents used after the first process content based on the use history information relating to the retrieved at least one of the plurality of management target systems during the retrieved period;
calculating the execution success probability based on the execution performance information relating to the retrieved at least one of the plurality of management target systems during the retrieved period; and
calculating an execution failure probability based on the execution performance information relating to the retrieved at least one of the plurality of management target systems during the retrieved period.

12. A management method for a plurality of management target systems,
the management method comprising:
storing, by a storage resource, a plurality of process contents for executing operation management of the plurality of management target systems, and use history information that indicates which of the plurality of process contents is used after each of the plurality of process contents, wherein the plurality of process contents comprising:
identifiers of a plurality of part contents included in each of the plurality of process contents; and
information indicating a dependence relationship between the plurality of part contents,
retrieving, by a processor of a management system, when an input comprising information for specifying a first process content that has been executed among the plurality of process contents and information for specifying one of the plurality of part contents that has failed to execute as a problem portion among the plurality of part contents included in the first process content is input, one of the plurality of process contents similar to the first process content from the plurality of process contents stored in the storage resource;
increasing, by the processor, an evaluation value of the retrieved one of the plurality of process contents when one of the plurality of part contents corresponding to the problem portion among the plurality of part contents included in the retrieved one of the plurality of process contents is different from the one of the plurality of part contents specified as the problem portion;
increasing, by the processor, the evaluation value of the retrieved one of the plurality of process contents when one of the plurality of part contents corresponding to a data source portion of the problem portion, which is identified based on the dependence relationship between the plurality of part contents among the plurality of part contents included in the retrieved one of the plurality of process contents, is different from one of the plurality of part contents of the data source portion of the problem portion of the first process content;
decreasing, by the processor, the evaluation value of the retrieved one of the plurality of process contents when one of the plurality of part contents corresponding to a first portion other than any one of the problem portion and the data source portion of the problem portion among the plurality of part contents included in the retrieved one of the plurality of process contents is different from one of the plurality of part contents of the first portion of the first process content;
increasing the evaluation value of one of the plurality of process contents used after the first process content in any one of the plurality of management target systems based on the use history information; and
outputting, by the processor, information relating to the plurality of process contents based on the evaluation value calculated for each of the plurality of process contents.

* * * * *